US012071302B2

(12) United States Patent
Austrheim

(10) Patent No.: US 12,071,302 B2
(45) Date of Patent: Aug. 27, 2024

(54) CONTAINER HANDLING VEHICLE WITH AN OPEN TOP, AND METHOD OF HANDLING PRODUCT ITEMS INTO STORAGE CONTAINER CARRIED BY THE VEHICLE

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 548 days.

(21) Appl. No.: 17/291,435

(22) PCT Filed: Oct. 14, 2019

(86) PCT No.: PCT/EP2019/077761
§ 371 (c)(1),
(2) Date: May 5, 2021

(87) PCT Pub. No.: WO2020/094339
PCT Pub. Date: May 14, 2020

(65) Prior Publication Data
US 2022/0002076 A1    Jan. 6, 2022

(30) Foreign Application Priority Data

Nov. 6, 2018 (NO) .................................. 20181419

(51) Int. Cl.
*B65G 1/04* (2006.01)
*B66C 23/50* (2006.01)
*B66D 1/36* (2006.01)

(52) U.S. Cl.
CPC ............ *B65G 1/0464* (2013.01); *B66C 23/50* (2013.01); *B66D 1/36* (2013.01)

(58) Field of Classification Search
CPC .............................. B65G 1/0464; B66C 23/50
See application file for complete search history.

(56) References Cited

U.S. PATENT DOCUMENTS 10,035,651 B2 * 7/2018 Lindbo ................ B65G 1/0464
10,497,594 B2 * 12/2019 Suzuki ................ B65G 1/0464
(Continued)

FOREIGN PATENT DOCUMENTS

NO          317366 B1      10/2004
WO     2014/075937 A1       5/2014
(Continued)

OTHER PUBLICATIONS

International Search Report issued in Application No. PCT/EP2019/077761, mailed on Jan. 24, 2020 (5 pages).
(Continued)

Primary Examiner — James Keenan
(74) Attorney, Agent, or Firm — Baker Botts L.L.P.

(57) ABSTRACT

A container handling vehicle picks up storage containers from a three-dimensional grid of an underlying storage system. The container handling vehicle includes a vehicle module part (P1); and a container lifting part. The vehicle module part (P1) includes a first set of wheels for moving the container handling vehicle in a first direction (X) and a second set of wheels for moving the container handling vehicle in a second direction (Y). The second direction is perpendicular to the first direction. The container lifting part extends sideways as a cantilever from the vehicle module part (P1) and includes a hoist frame (P2) with an opening (OSP) defining an access perimeter; a hoist mechanism carried by the hoist frame (P2); a plurality of lifting bands connected to the hoist mechanism and guided by the hoist frame (P2); and a lifting frame for releasable connection to a storage container, the lifting frame being suspended in a horizontal orientation from the hoist frame (P2) by the
(Continued)

plurality of lifting bands. The lifting frame has an opening (OLF) defining an access perimeter. The access perimeter of the opening (OSP) in the hoist frame (P2) corresponds in shape and alignment to the access perimeter of the opening (OLF) in the lifting frame to allow access to items in the storage container through the respective openings (OSP, OLF) when the lifting frame has been lifted up to the hoist frame (P2) by the hoist mechanism.

15 Claims, 17 Drawing Sheets

(56) References Cited

U.S. PATENT DOCUMENTS

| | | | |
|---|---|---|---|
| 10,759,597 B2 * | 9/2020 | Lindbo | B65G 1/0464 |
| 10,882,540 B2 * | 1/2021 | Stadie | B65G 1/0464 |
| 2021/0300678 A1 * | 9/2021 | Van Buijtene | B65G 1/0464 |

FOREIGN PATENT DOCUMENTS

| | | |
|---|---|---|
| WO | 2014/090684 A1 | 6/2014 |
| WO | 2015/193278 A1 | 12/2015 |
| WO | 2016/029205 A1 | 2/2016 |
| WO | 2016/198467 A1 | 12/2016 |
| WO | 2017/081275 A1 | 5/2017 |
| WO | 2018/073392 A1 | 4/2018 |
| WO | 2018/190712 A1 | 10/2018 |
| WO | 2019/032651 A1 | 2/2019 |
| WO | 2019/137870 A1 | 7/2019 |

OTHER PUBLICATIONS

Written Opinion issued in International Application No. PCT/EP2019/077761, mailed on Jan. 24, 2020 (6 pages).

* cited by examiner

CONTAINER HANDLING VEHICLE WITH AN OPEN TOP, AND METHOD OF HANDLING PRODUCT ITEMS INTO STORAGE CONTAINER CARRIED BY THE VEHICLE

The present invention relates to a container handling vehicle with an open top such that product item(s) can be put into or picked out from the storage container carried by the container handling vehicle, as well as an associated method.

BACKGROUND AND PRIOR ART

FIGS. 1A and 1C disclose a typical prior art automated storage and retrieval system 1 with a framework structure 100. FIGS. 1B and 1D disclose prior art container handling vehicles 200,300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage grid 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 respectively due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X, In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a container receiving space arranged centrally within the vehicle body, e.g. as is described in WO2014/090684A1, the contents of Which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column, e.g. as is disclosed in WO2014/090684A1.

The rail system 108 may be a single rail (also denoted single track) system, as is shown in FIG. 2A. Alternatively, the rail system 108 may be a double rail (also denoted double track) system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box. For example, the sections of the rail-based system being made of aluminium are the rails, and on the upper surface of the rails, there are a pair of tracks that the wheels of the vehicle run in. However, the sections could be separate rails each with a track.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space therebetween.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 front an access or a transfer station. Each of the ports of the first and second delivery column may comprise a port suitable for both pick up and drop of storage containers.

The second location may typically be a picking or a stocking station where product product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g., for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column and the access station.

If the lower port of the delivery column and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

A disadvantage of the prior art container handling vehicles is that the contents of the storage containers are not accessible during transport of the container handling vehicles.

SUMMARY OF THE INVENTION

The invention is set forth in the independent claims and the dependent claims describe alternatives of the invention.

It is described a container handling vehicle for picking up storage containers from a three-dimensional grid of an underlying storage system, the container handling vehicle comprising:
 a vehicle module part; and
 a container lifting part,
 the vehicle module part comprising a first set of wheels for moving the container handling vehicle in a first direction and a second set of wheels for moving the container handling vehicle in a second direction, the second direction being perpendicular to the first direction, wherein
 the container lifting part extends sideways from the vehicle module part and comprises:
  a hoist frame with an opening defining an access perimeter;
  a hoist mechanism carried by the hoist frame;
  a plurality of lifting bands connected to the hoist mechanism and guided by the hoist frame; and
  a lifting frame for releasable connection to a storage container, the lifting frame being suspended in a horizontal orientation from the hoist frame by the plurality of lifting bands, the lifting frame having an opening defining an access perimeter, wherein the access perimeter of the opening in the hoist frame corresponds in shape and alignment to the access perimeter of the opening in the lifting frame to allow access to items in the storage container through the respective openings when the lifting frame has been lifted up to the hoist frame by the hoist mechanism.

The vehicle module part is the part of the container handling vehicle housing any wheels and track shift for driving the container handling vehicle, any motor for driving the wheels, track shift motor(s), batteries for providing power to the different parts of the robot etc.

The container lifting part is the part of the container handling vehicle housing the hoist frame with hoist mechanism and lifting bands, as well as the lifting frame.

The hoist mechanism typically comprises lifting means such as a lifting frame and sheaves, onto which lifting frame the lifting bands are wound/unwound, and over which sheaves the lifting bands are guided towards the lifting shaft.

Most of the components necessary for the function of the container handling vehicle are arranged in the vehicle module part, whereas only a few parts necessary for the lifting frame to travel up and down are arranged in the container lifting part (i.e. hoist frame). This configuration, i.e. that only the components of utmost necessity are arranged in the hoist frame, has the advantage that the access perimeter of the opening in the hoist frame can be as large as possible, and advantageously substantially equal to an access perimeter of the opening in the lifting frame.

The relatively large opening in the hoist frame is made possible by a modified lifting device comprising one common lifting shaft for all lifting bands, in addition to arranging most of the components forming part of the lifting device in the vehicle module part of the container handling vehicle.

The access perimeters of the openings in the hoist frame and the lifting frame may be substantially equal to an access perimeter of an opening in the storage container, i.e. equal in size in terms of length and width relative the opening in the storage container. This is rendered possible by moving the lifting axle and motor for driving the lifting axle to the side of the access perimeters such that the lifting axle are not of any hindrance in respect of accessing the interior of the storage container through the respective openings.

The access perimeters of the openings in the top part and the lifting frame and the access perimeter of an opening in a storage container may be within a size ratio of at least 80% relative each other, more preferably of at least 90% relative each other, and even more preferably of at least 95% relative each other.

The opening in the hoist frame the opening in the lifting frame and the opening in the top of the storage container may have substantially equal vertical projection securing access from above the container handling vehicle to the interior of the storage container. The vertical projections may be vertical or near vertical. The vertical projections may be within a size ratio of at least 80% relative each other, more preferably of at least 90% relative each other, and even more preferably of at least 95% relative each other.

The hoist frame may comprise a pair of arms and a sheave may be connected to a distal end of each arm. The arms may extend horizontally.

The hoist frame may comprise a crosspiece connected at the distal ends of the arms, thereby forming an enclosure for the access perimeter of the opening in the hoist frame.

The axes of rotation for the sheaves may extend perpendicularly to the arms of the hoist frame.

The hoist mechanism may comprise a lifting shaft for winding up/unwinding the lifting bands simultaneously. The lifting shaft is arranged in the container lifting part, i.e. the lifting shaft is laterally displaced relative the openings in the lifting frame and in the hoist frame.

The lifting bands may be guided by the sheaves to a lifting shaft which winds up/unwinds all lifting bands simultaneously.

The ends of the lifting bands at the distal end of the hoist frame (e.g. lifting shaft) may be spaced wider on the lifting frame than the lifting bands closest to the vehicle module part, preferably as wide as possible to ensure that the access perimeter of the opening in the hoist frame is made as large as possible.

The connection points for the lifting bands on the lifting shaft may be arranged laterally offset relative the lifting frame, in all positions of the lifting frame. All positions include when the lifting frame is in the uppermost position and the lifting bands are reeled onto the lifting shaft. This ensures that the access perimeter of the opening in the hoist frame directly above the lifting frame is not occupied by the lifting bands nor lifting shaft.

A motor for the hoist mechanism may be arranged between a side of the opening of the hoist frame closest to the vehicle module part.

The motor can be an electric motor with a rotor/stator of the motor encircling the lifting shaft.

The motor can be connected to the lifting shaft via an angled transmission and extend below the lifting shaft in the vehicle module part. Preferably, the motor is completely enclosed within the vehicle module part, i.e. it is not extending into the hoist frame.

The container lifting part may extend as a cantilever from the vehicle module part.

The container lifting part may be mounted on a turret for rotation with respect to the vehicle module part.

It is further described a method of handling a storage container using the container handling vehicle described above, wherein the method comprises the steps of:

lifting a storage container up on a side of the vehicle module part to a container receiving space below the hoist frame of the container handling vehicle such that an access perimeter of the opening in the hoist frame corresponds to the access perimeter of the opening in the lifting frame carrying the storage container providing a through-going opening from above the container handling vehicle to an interior of the storage container;

picking product item(s) from, or placing product item(s) into, the interior of the storage container through the through-going opening.

A footprint of each of the vehicle module part and the container lifting part may be substantially equal or equal to a grid cell, such that the container handling vehicle does not occupy more than two grid cells. Further, if travelling on a double rail system, two container handling vehicle may pass each other on adjacent grid cells, occupying a total of four grid cells.

BRIEF DESCRIPTION OF THE DRAWINGS

The following drawings depict alternatives of the present invention and are appended to facilitate the understanding of the invention. However, the features disclosed in the drawings are for illustrative purposes only and shall not be interpreted in a limiting sense.

FIG. 1 A-D are perspective views of a prior art automated storage and retrieval system, where

FIG. 2A shows a single rail system, FIG. 2B shows a double rail system and FIG. 2C shows a double rail system indicated width and length of a container handling vehicle grid cell.

FIG. 6A shows the container handling vehicle with a storage container directed towards north, FIG. 6A shows a storage container during the rotational motion with the storage container directed northeast, and FIG. 6C shows the situation after 180 degrees rotation of the storage container with the storage container directed towards south.

DETAILED DESCRIPTION OF THE INVENTION

Figure 1A:
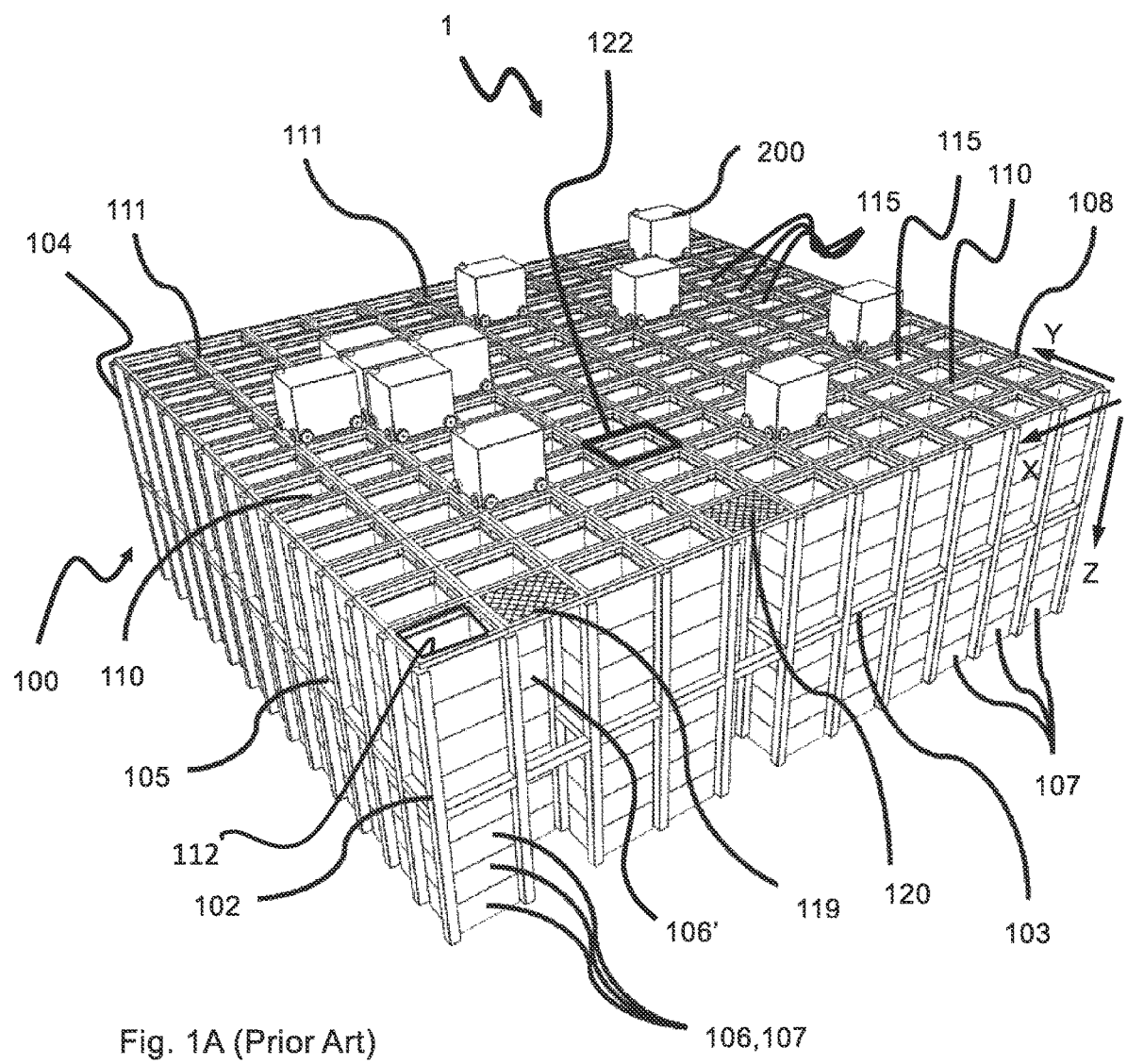
FIG. 1A and FIG. 1C show the complete system and FIG. 1B and FIG. 1D show examples of system operable prior art container handling vehicles.
Figure 1B:
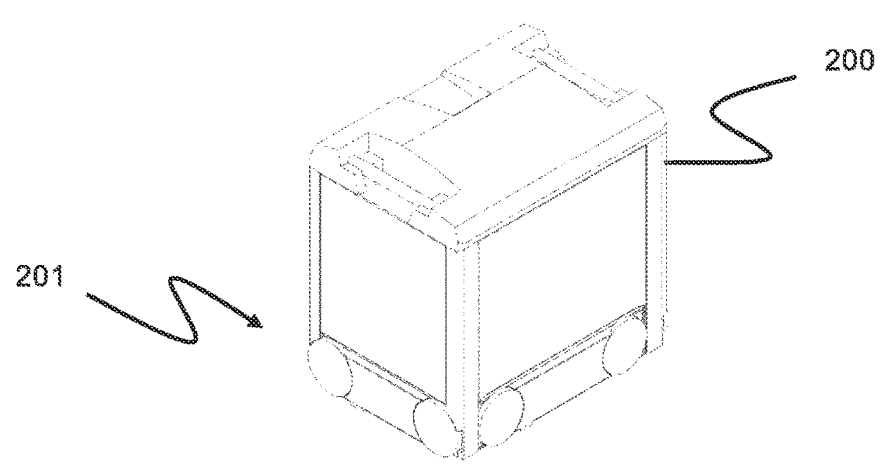

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

With reference to FIGS. 1A-D the storage grid 104 of each storage structure 1 constitutes a framework 100 of in total 143 grid columns 112 (see grid column 112 in top front corner, i.e. grid location or cell X=11, Y=1, Z=0), where the width and length of the framework corresponds to the width and length of 13 and 11 grid columns 112, respectively. The top layer of the framework 100 is a container handling vehicle rail system/rail system 108 onto which a plurality of container handling vehicles 200,300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid opening 115, i.e. along the X and Y directions, may be defined by the distance between adjacent rails 110 and 111, respectively (see also FIGS. 2A-2C), In FIGS. 1A and 1C, a grid cell 122 is marked on the rail system 108 by thick lines. The area between adjacent rails is the grid opening 115—the grid cell 122 is the area to the outside edges of the opposing rails running along the opposite sides of the grid opening. Alternatively, if these are defined in terms of double-tracked rails, then the area is to the midpoint or centre of each adjacent rail.

The container handling vehicle rail system 108 allows the container handling vehicles 200,300 to move horizontally between different grid locations, where each grid location is associated with a grid cell 122.

Figure 1C:
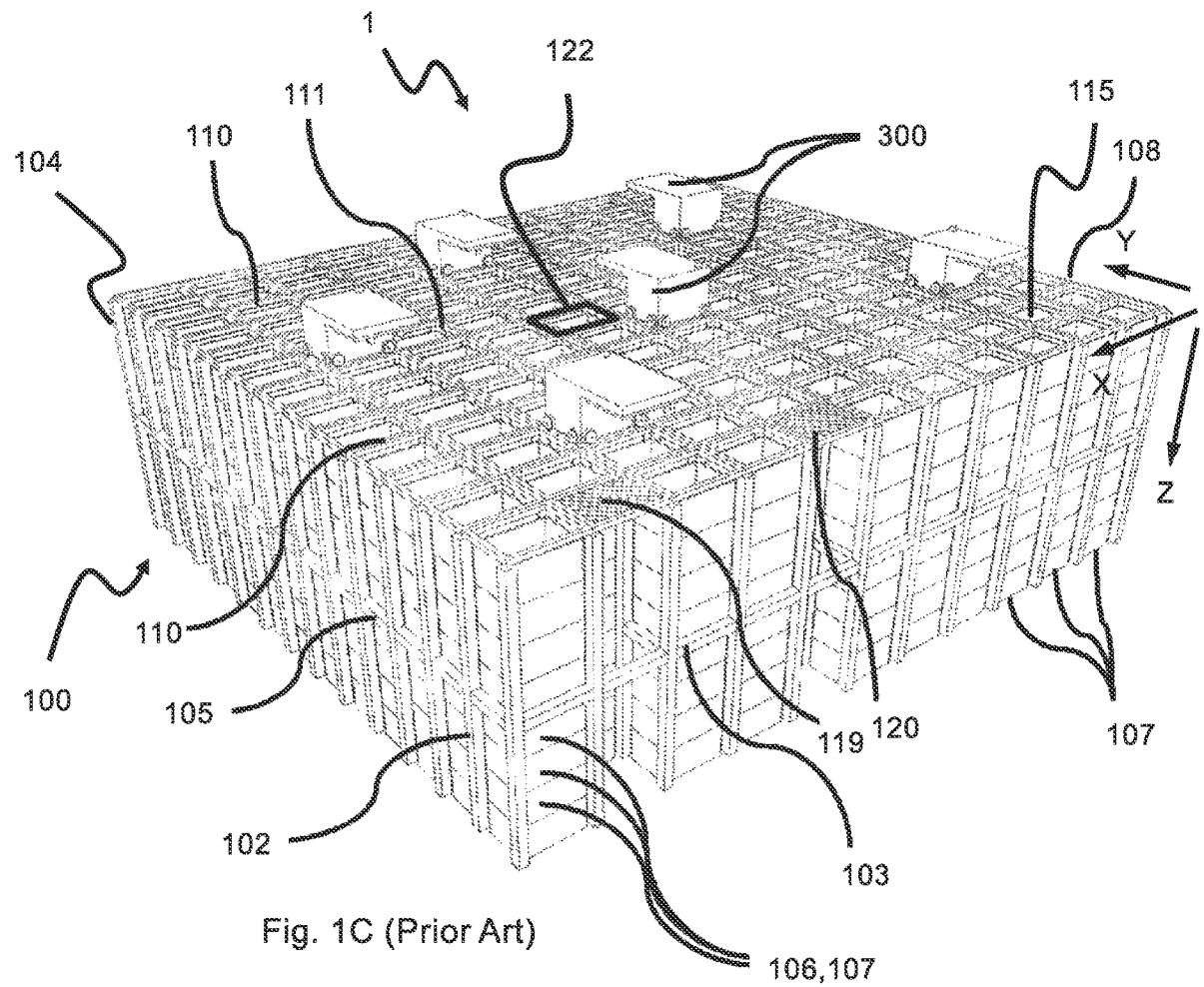
Figure 1D:
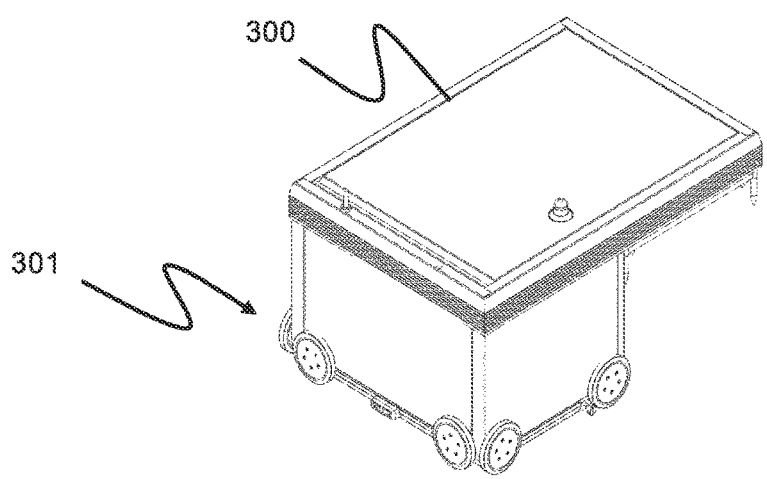

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122, or any size in between these examples, e.g. 100×100 grid cells, 200×200 grid cells, 500×500 grid cells etc. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2A:
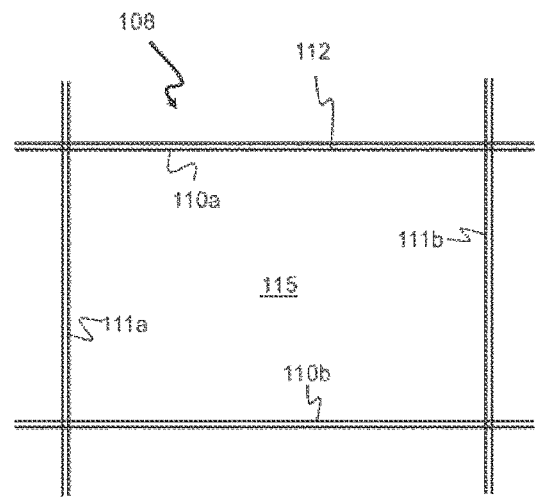
FIG. 2A-C is a top view of a container handling vehicle rail system, where
Figure 2B:
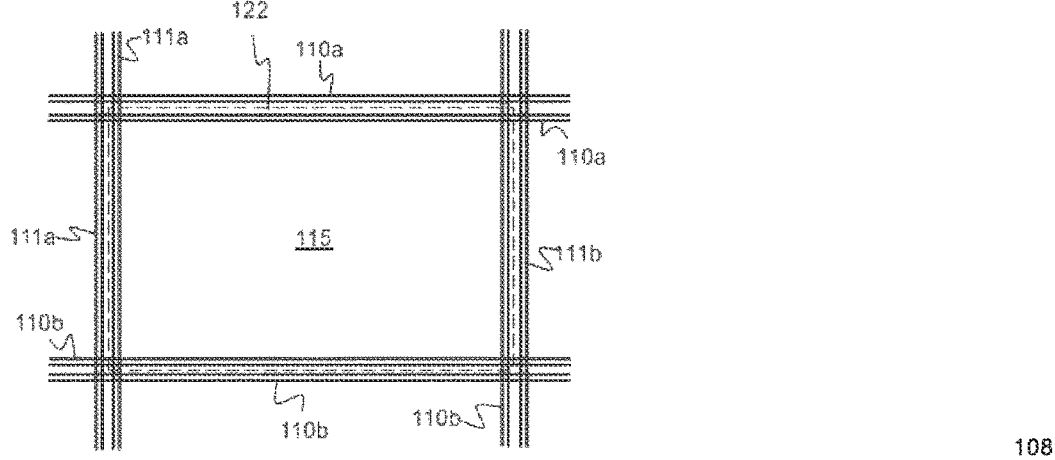
Figure 2C:
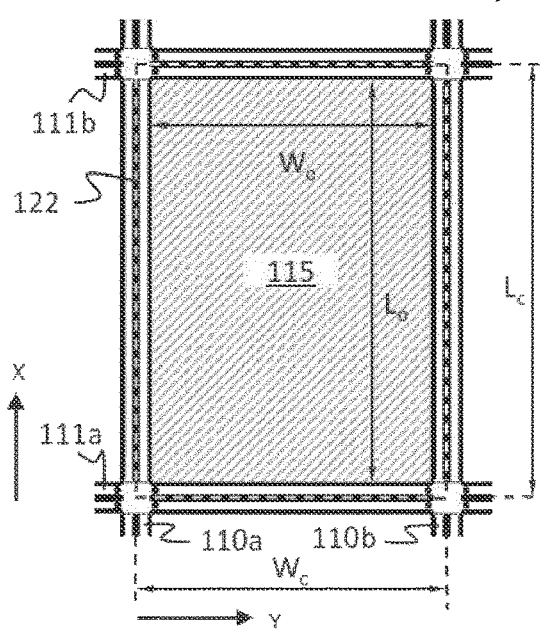

The rail system 108 may be a single rail system, as is shown in FIG. 2A. Alternatively, the rail system 108 may be a double rail system, as is shown in FIG. 2B. In a further alternative, the rail system 108 may be a combination of single and double rail system. Details of the single and double rail systems are disclosed in this specification under the section of background and prior art.

Figure 3A:
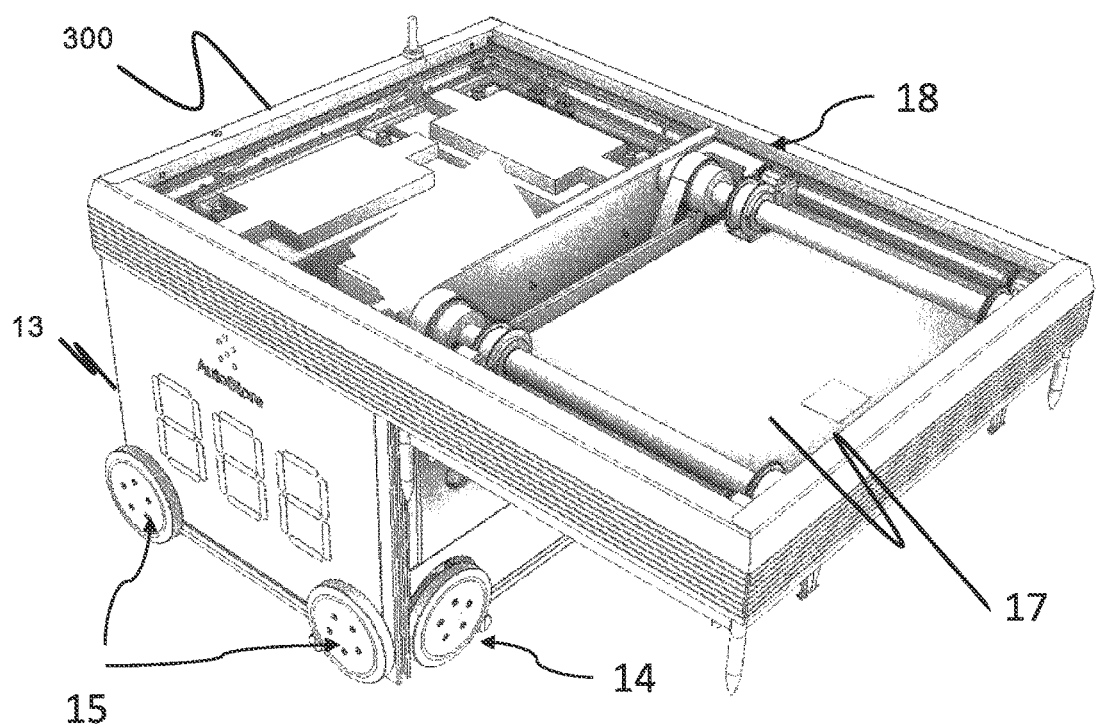
FIG. 3A is an example of a prior art container handling vehicle where the top cover has been removed, the container handling vehicle having a lifting frame in the form of a lifting plate of substantially equal size as a top access perimeter area of the storage container.

FIG. 3A is an example of a prior art container handling vehicle where the top cover has been removed, the container handling vehicle 300 having a lifting frame in the form of a lifting plate 17 of substantially equal size as a top access perimeter area of the storage container (not shown in this Figure).

Figure 3B:
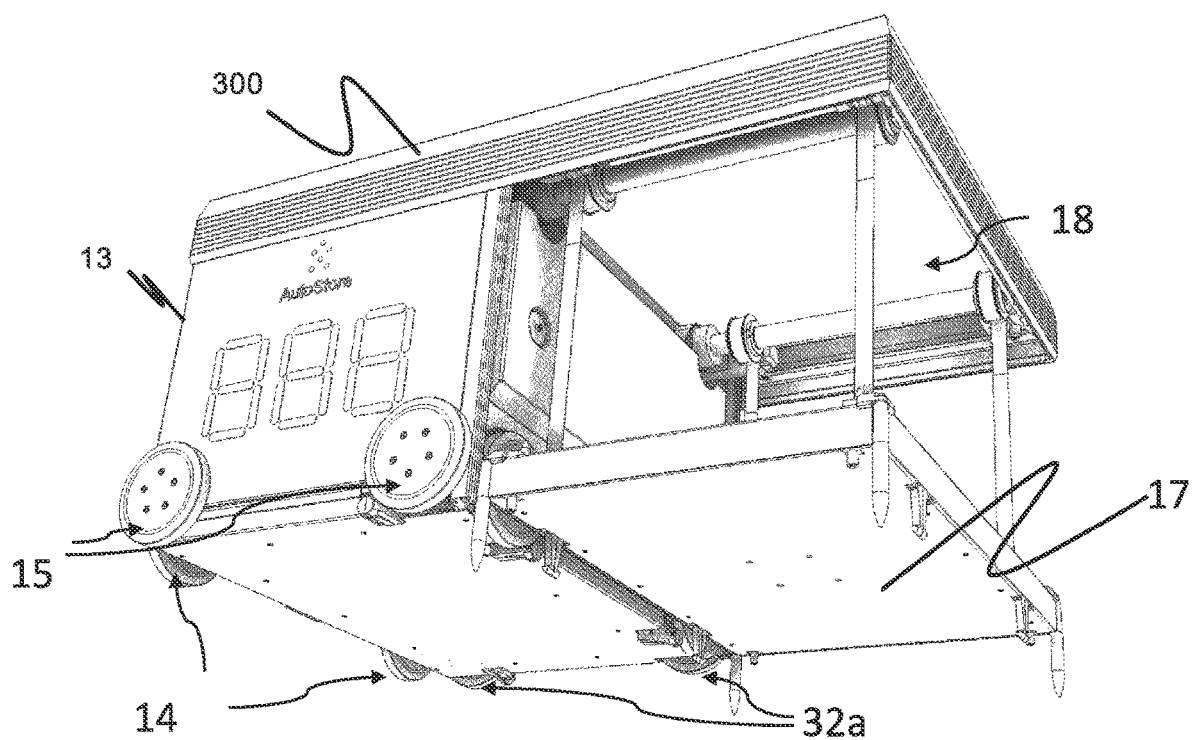
FIG. 3B is a view from below of the container handling vehicle of FIG. 3A.
Figure 3C:
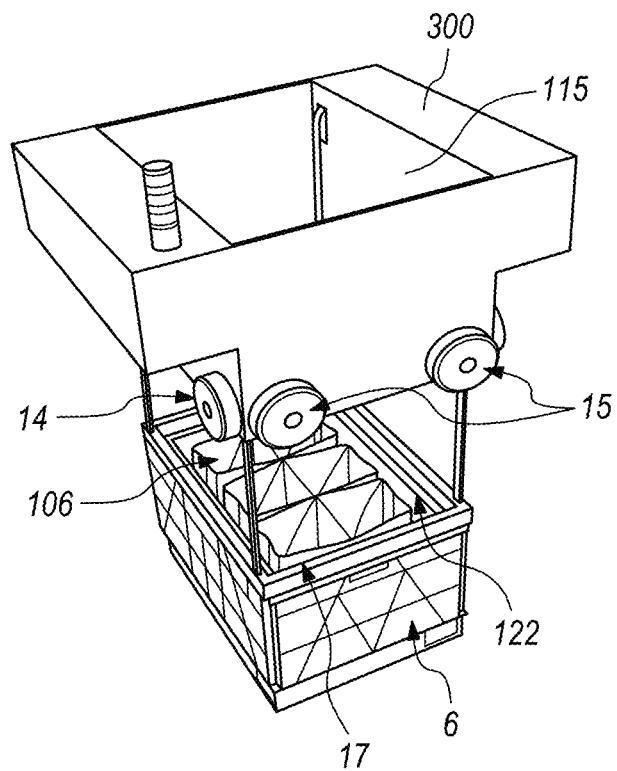
FIG. 3C is a schematic, perspective view of a prior art robotic device disclosed in WO 2017/081275 comprising an opening in the top surface of the vehicle body, thereby extending a container receiving space through the robotic device, the extended container receiving space enabling the content of the bin or delivery container to be accessed through the top of the device.

FIG. 3B is a view from below of the container handling vehicle of FIG. 3A;

FIG. 3C is a schematic, perspective view of a prior art robotic device disclosed in WO 2017/081275 comprising an opening in the top surface of the vehicle body, thereby extending a container receiving space through the robotic device, the extended container receiving space enabling the content of the bin or delivery container to be accessed through the top of the device.

Figure 3D:
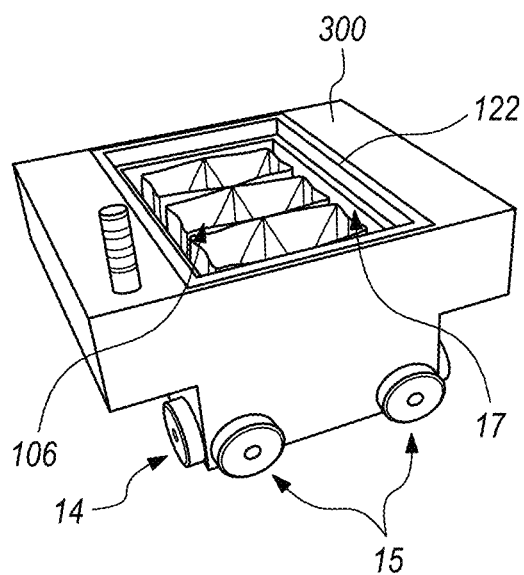
FIG. 3D is a schematic, perspective view of the prior art robotic device of FIG. 3C showing a delivery container in situ in the extended container receiving space.

FIG. 3D is a schematic, perspective view of the prior art robotic device of FIG. 3C showing a delivery container in situ in the extended container receiving space.

A disadvantage of the prior art container handling vehicles is that the contents of the storage containers is not accessible during transport of the container handling vehicles.

Another disadvantage of the prior art, is the requirement of a lifting band drive assembly featuring two lifting shafts arranged on opposite sides of a lifting frame to provide the required positioning of the lifting bands relative the lifting frame. Two lifting bands are spooled on and off each lifting shaft. Further, to rotate the secondary shafts and/or sheaves they are connected to a rotor shaft via belts/chains which require space.

Figure 4A:
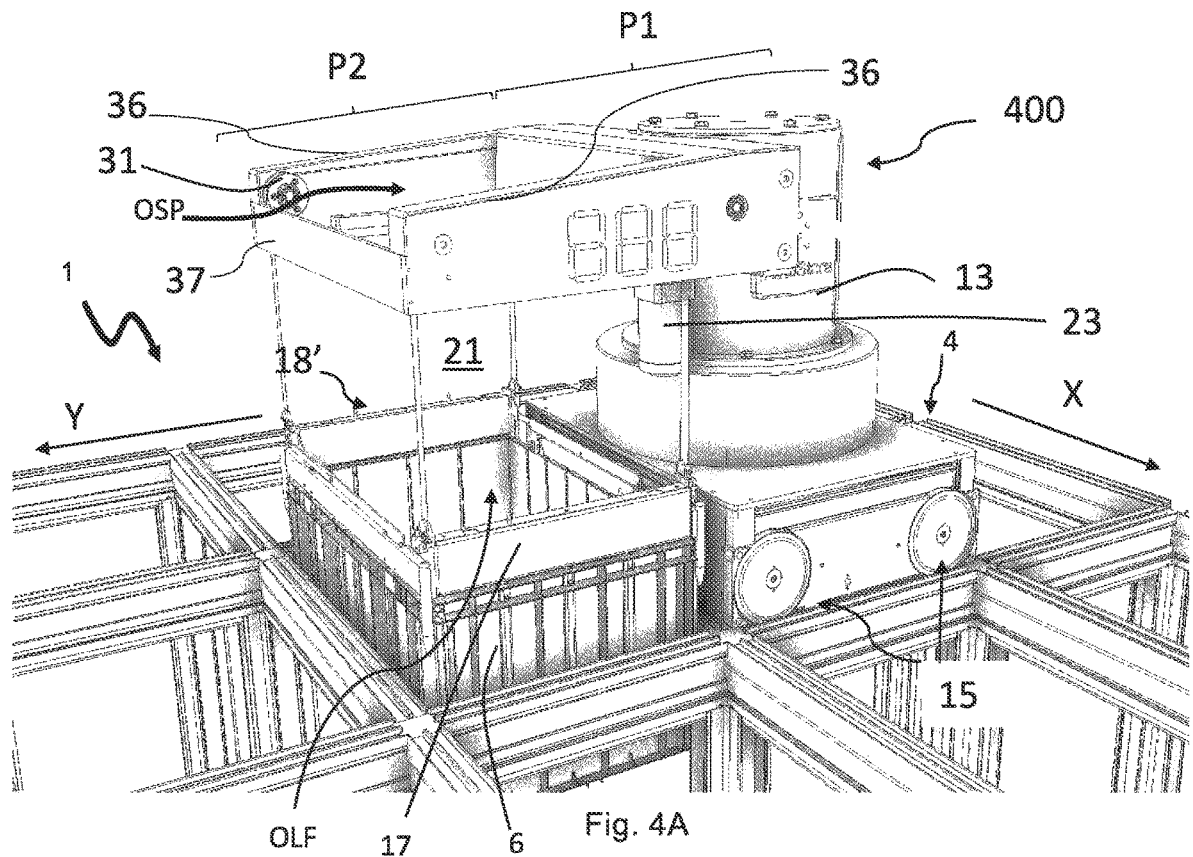
FIG. 4A is a perspective view of an exemplary container handling vehicle according to the invention arranged on a storage grid, arranged with a motor arrangement comprising a motor and angled transmission for driving the lifting shaft.

With reference to FIG. 4A and as described for the prior art first and second container handling vehicles 200,300, the container-handling vehicle 400 is suitable for picking up storage containers 6 from a three-dimensional grid 4 of an underlying storage system 1, see FIG. 1. The container handling vehicle 400 features a first set of wheels 14 (not visible in FIG. 4A) arranged at opposite sides of the vehicle body 13, for moving the vehicle 400 along a first direction X on the grid 4, and a second set of wheels 15 arranged at opposite sides of the vehicle body 13, for moving the vehicle 400 along a second direction Y on the grid 4, the second direction Y being perpendicular to the first direction X. By use of a wheel displacement assembly (not shown in the Figure, but typically arranged in the base of the vehicle body 13), the first set of wheels 14 may be displaced in a vertical direction Z between a first position, wherein the first set of wheels 14 allow movement of the vehicle 400 along the first direction X, and a second position, wherein the second set of wheels 15 allow movement of the vehicle 400 along the second direction Y.

In FIG. 4A a vehicle module part P1 of the container handling vehicle 400 occupies an area corresponding to one grid cell 122 (see FIG. 1) and a hoist frame P2 of the container handling vehicle occupies an area corresponding to one grid cell 122, The container lifting part comprises the hoist frame P2 and extends sideways (so-called cantilever construction) from the vehicle module part P1. The hoist frame comprises an opening having an access perimeter denoted OSP.

Most of the components necessary for the function of the container handling vehicle 400 are arranged in the vehicle module part P1, whereas only a few parts necessary for the horizontal lifting device 18' to travel up and down are arranged in the hoist frame P2.

The horizontal lifting device 18' comprises a lifting frame 17 with an opening having an access perimeter OLF. This configuration, i.e. that only the components of utmost necessity are arranged in the hoist frame P2, has the advantage that the access perimeter of the opening OSP in the hoist frame P2 can be as large as possible, and advantageously substantially equal to an access perimeter of the opening OLF in the lifting frame 17. The access perimeter of the opening OLF in the lifting frame 17 is substantially equal to the top opening in the storage container 6. The relatively large opening OSP in the hoist frame P2 is made possible by a modified lifting device 18' comprising one common lifting shaft 22 for all lifting bands, in addition to arranging most of the components forming part of the lifting device in the vehicle module part P1 of the container handling vehicle 400, which will be described in greater detail below.

A container receiving space 21 below the lifting device 18' is sized to accommodate a storage container 6 suitable for a storage system as described above. The lifting device 18' is arranged to lift/lower a storage container 6 from/to the grid 4. When the storage container is in the container receiving space 21, the bottom of the storage container is at a level above the lowest level of the second set of wheels 15 which again is above the top of the rails/tracks. In the embodiment of FIG. 4A, the bottom of the storage container is above the upper surface of the vehicle body so that it does not engage the vehicle body as it is turned through 180 degrees.

Figure 4B:
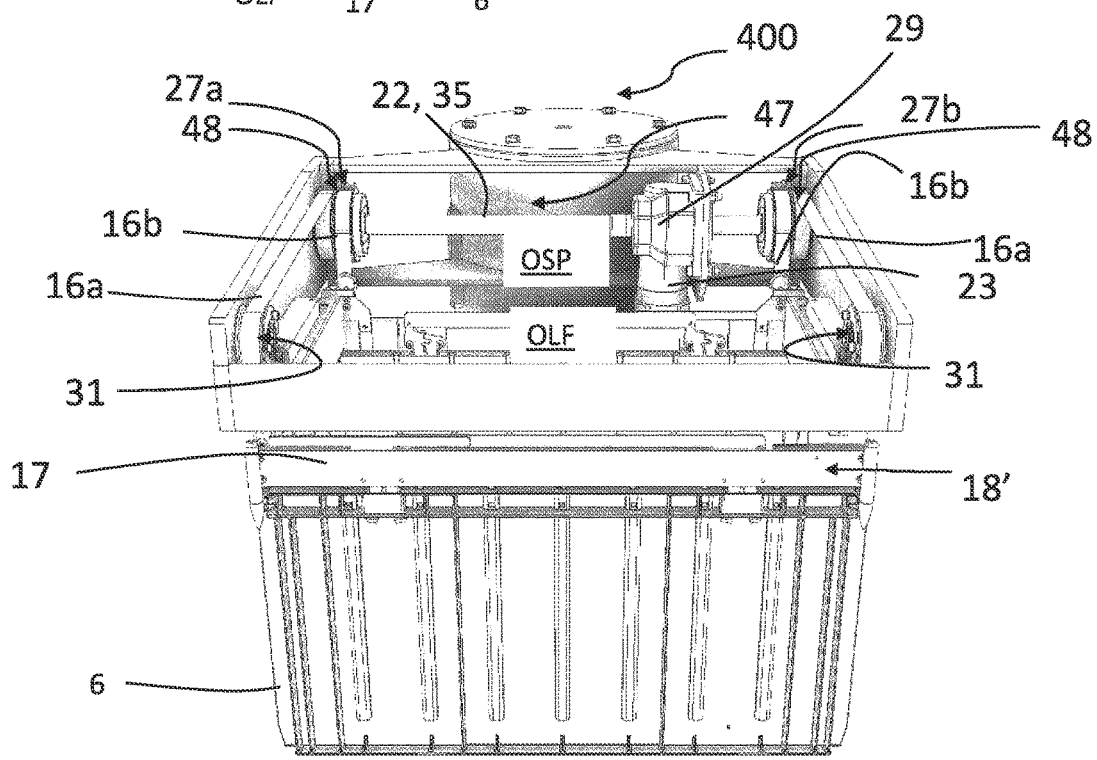
FIG. 4B is a view of the container handling vehicle carrying a storage container of FIG. 4A seen from the front, where top covers have been removed to show the setup of lifting axle, sheaves, motor and gear, and lifting bands.

As shown in FIG. 4B, the lifting device 18' comprises a horizontal lifting shaft assembly 47 comprising a lifting shaft 22 and one motor 23 connected to an angled transmission 29 for rotating the lifting shaft 22, a lifting frame 17 for releasable connection to a storage container 6, and a first and second pair of lifting bands 16a,16b. The motor 23, i.e. the motor axis, is oriented downwards (i.e. vertically) towards the base of the vehicle body 13 and is situated in the vehicle module part P1 of the container handling vehicle 400. The lifting bands 16a,16b connect the lifting shaft 22 to the lifting frame 17. The lifting frame 17 is in an uppermost position within the container receiving space 21 and carries a storage container 6. Both the top opening in the storage container 6, the opening OLF in the lifting frame 17 and the opening OSP in the hoist frame P2 coincide providing access from above the hoist frame P2, through opening OSP, further through opening OLF and finally through the top of the storage container 6 to the interior of the storage container 6 for handling contents such as product item(s) to or from the interior of the storage container 6. In other words, the opening OSP in the hoist frame P2, the opening OLF in the lifting frame 17 and the opening in the top of the storage container 6 may have substantially equal vertical projection securing access from above the container handling vehicle 400 to the entire interior and all contents in the storage container 6.

The lifting shaft 22 comprises a first end section 27a and a second end section 27b interconnected via an intermediate shaft element 35.

Each lifting band 16a, 16b has a first end and a second end connected to the lifting shaft 22 and the lifting frame 17, respectively. Each pair of lifting bands 16a, 16b has a first lifting band connected at the first end section 27a of the lifting shaft and a second lifting band connected at the second end section 27b of the lifting shaft. The first pair of lifting bands 16a extend in a substantially horizontal direction from the lifting shaft 22 towards a pair of sheaves 31 (i.e. a band guiding assembly). The sheaves 31 are arranged to change the direction of the first pair of lifting bands 16a to extend in a vertical direction. The second pair of lifting bands 16b extends in a vertical direction directly from the lifting shaft 22, or alternatively via a sheave (not shown) to make sure that the lifting shaft and reeled lifting band are lateral offset relative the lifting frame 17 (i.e. the lifting shaft 22 and reeled lifting band are arranged in the vehicle module part P1 and the lifting frame 17 is arranged in the container lifting part). If the lifting shaft 22 and/or reeled lifting band(s) were arranged in the container lifting part, e.g. partly above and overlapping the lifting shaft 22, the available access perimeter opening OSP would be reduced and most likely not coincide with the opening OLE in the lifting frame 17 (and thereby not the top opening of the storage container 6). In other words, the respective vertical projections of the opening OSP, opening OLE and top of storage container 6 would not coincide resulting in restricted access to the interior of the storage container 6.

The lifting band drive assembly of the container-handling vehicle 400, or lifting device 18', requires a minimum of separate parts, i.e. the lifting shaft assembly 47 and the pair of sheaves 31, to achieve its function.

Figure 4C:
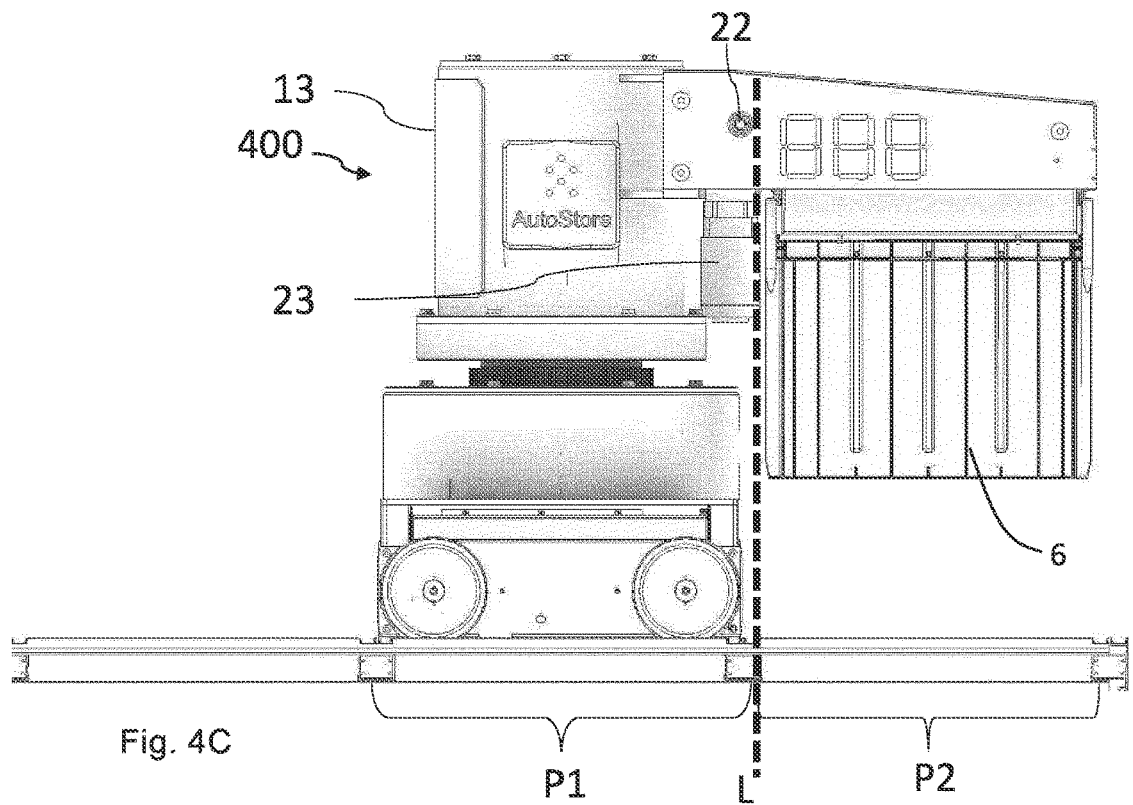
FIG. 4C is a side view of the container handling vehicle of FIGS. 4A and 4B, indicating the first part and the hoist frame of the container handling vehicle and with a lifting device carrying a storage container, the lifting device being in an upper position.
Figure 4D:
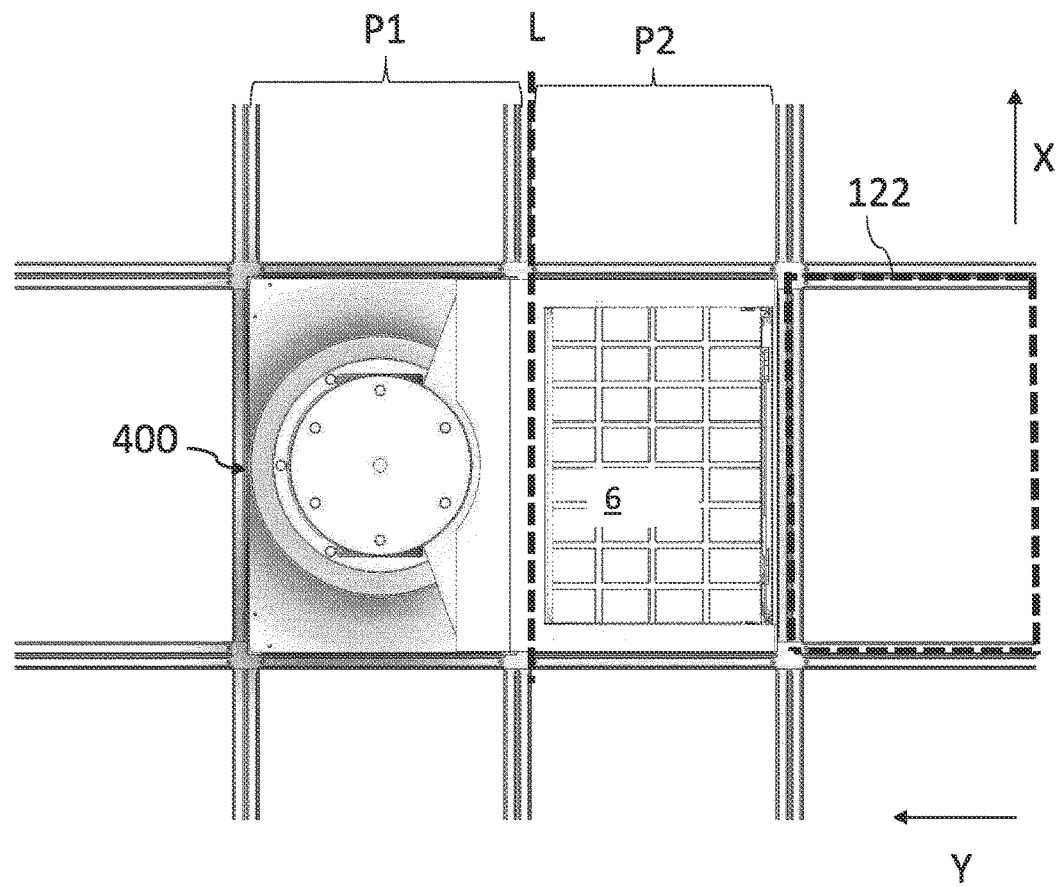
FIG. 4D is a top view of the container handling vehicle in FIGS. 4A-4C.
Figure 4E:
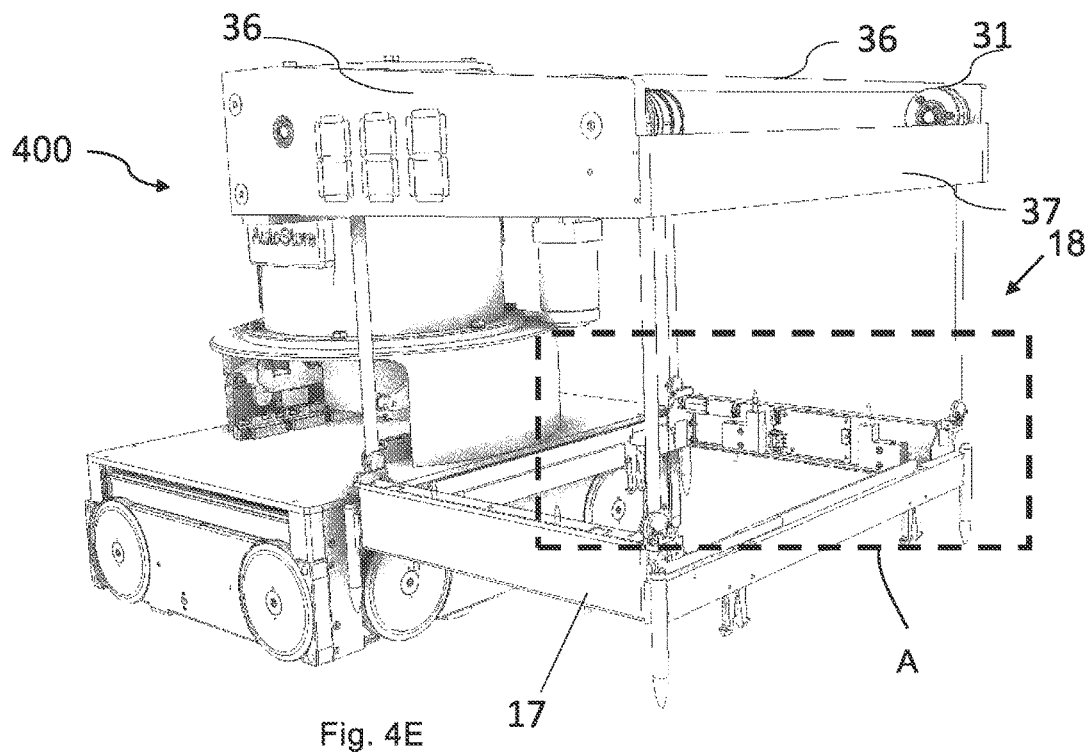
FIG. 4E is a perspective view of a container handling vehicle of FIGS. 4A to 4D without a storage container and with the lifting device/lifting frame in an intermediate position with internal covers of the lifting frame removed.
Figure 4F:
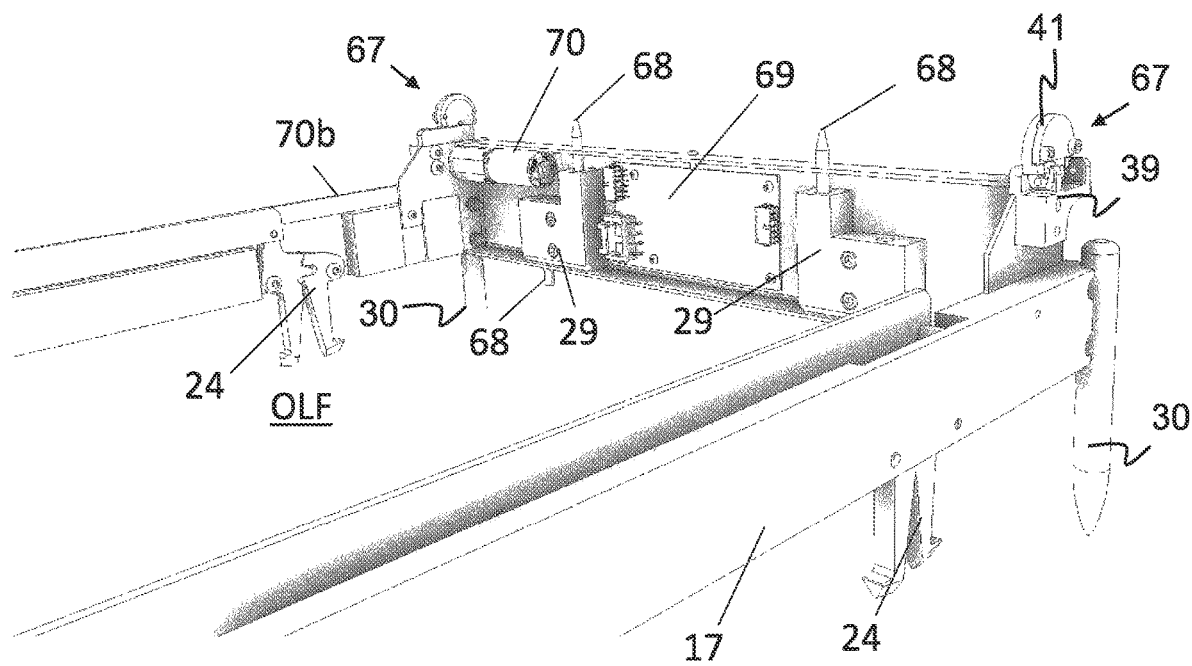
FIG. 4F is an enlarged view of the lifting frame in section A in FIG. 4E.
Figure 4G:
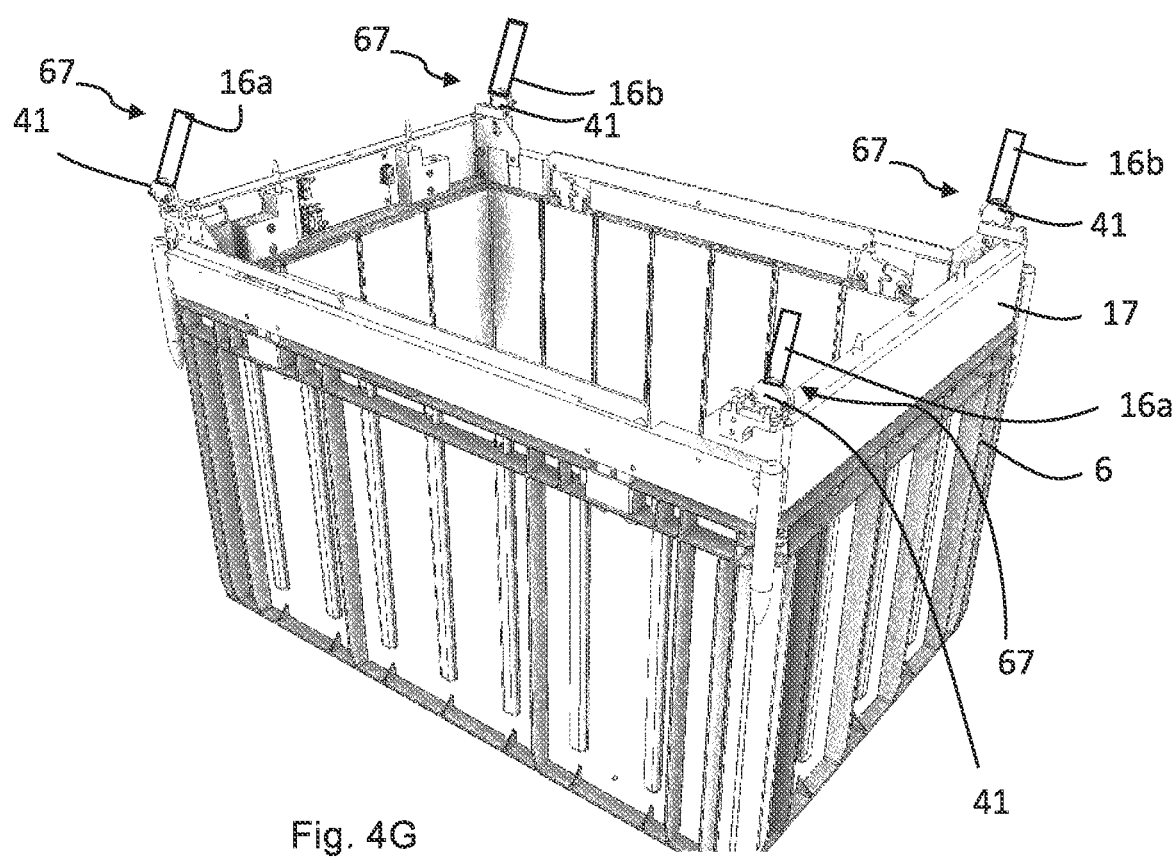
FIG. 4G shows a lifting frame carrying a storage container, the remaining parts of the container handling vehicle and lifting device are omitted.

When extending in the vertical direction, the lifting bands 16a,16b are arranged at a horizontal distance from each other corresponding to the horizontal distance between corresponding lifting band connecting elements 67 on the lifting frame 17 (see FIGS. 4F and 4G). The lifting band connecting elements 67, with lifting band clamps 41, may be arranged on an upper part of the lifting frame 17. The first pair of lifting bands 16a is preferably arranged as far apart from each other as possible such as to make the available space, i.e. the access perimeter, between them as large as possible, i.e. the lifting bands 16a at the distal end of the hoist frame P2 are spaced wider on the lifting frame 17 than the lifting bands 16b closest to the vehicle module part P1. The first set of lifting bands 16a are thus preferably arranged with a larger distance from each other than the corresponding second sets of lifting bands 16b on the lifting shaft 22, and preferably connected closest to each end of the lifting shaft 22 relative the second set of lifting bands 16b. Consequently, the band connecting elements 67 connected to the second set of lifting bands 16b are arranged further away from each respective closest corner of the lifting frame 17 relative the lifting band connecting elements 67 connected to the first set of lifting bands 16a (see details in FIG. 4G).

By arranging the lifting shaft assembly 47 such that the second pair of lifting bands 16b extends vertically from the lifting shaft towards the corresponding band connecting elements 67 on the lifting frame 17, the lifting device 18' will occupy a minimum of space in the container lifting part. In other words, the required position and/or direction of the second pair of lifting bands 16b is obtained without an additional band guiding assembly.

As disclosed in FIGS. 4C and 4D, the container handling vehicle 400 does not occupy more than two grid cells 122, i.e. it has a footprint in the X direction, i.e. the horizontal extent in the X direction seen from above, covering two grid cells 122 and a footprint in the Y direction, i.e. the horizontal extent in the Y direction seen from above, covering a single grid cell 122. An imaginary vertical plane L is drawn up in FIGS. 4C and 4D to illustrate the separation of the vehicle module part P1 from the hoist frame P2 and further illustrating which components are in the vehicle module part P1 and within the lateral extent of the hoist frame P2, respectively.

FIGS. 5A-5F show a container handling vehicle 400 with an alternative motor arrangement with an electric motor 23a, 23b with a rotor/stator motor encircling the lifting shaft 22. The other components are similar to the alternative motor 23 and angled transmission 29 described in relation to FIG. 4. Therefore, the features described in relation to the lifting shaft 22 and container handling vehicle 400, except the particular chosen motor, whether it is an electric motor coupled to an angled transmission 29 as illustrated in FIG. 4 or an electric motor 23a, 23b with a rotor stator encircling the lifting shaft 22 as in FIG. 5, are the same and are valid for both motor alternatives. Consequently, features relating to the container handling vehicle 400 in FIG. 4 are valid for the container handling vehicle 400 disclosed in FIGS. 5 and 6, and vice versa.

Figure 5A:
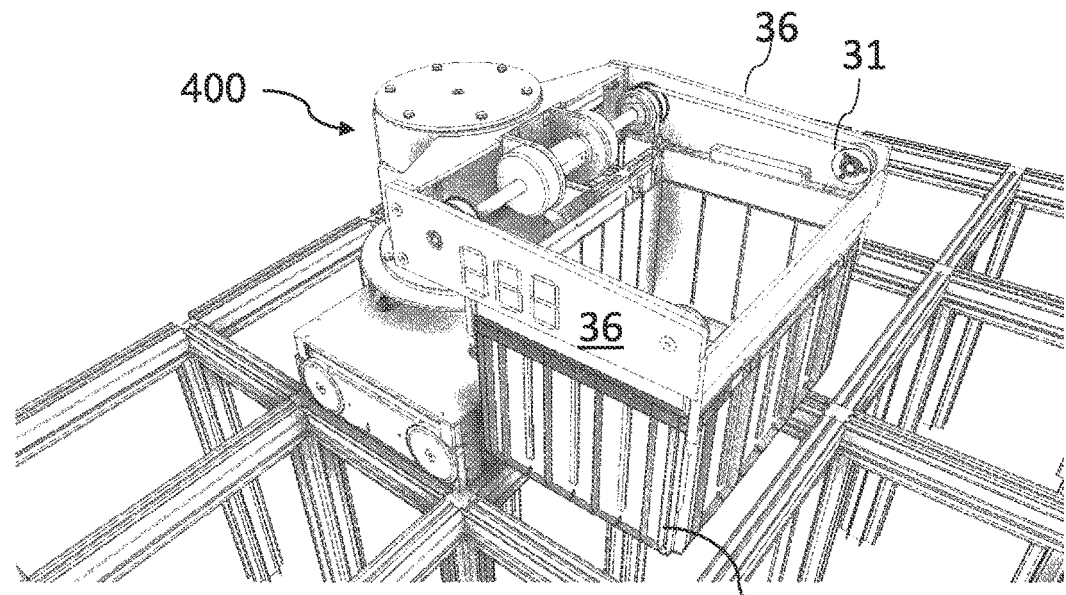
FIGS. 5A and 5B show another exemplary container handling vehicle with an alternative motor arrangement for driving the lifting shaft, with an electric motor with a rotor/stator motor encircling the lifting shaft.
Figure 5B:
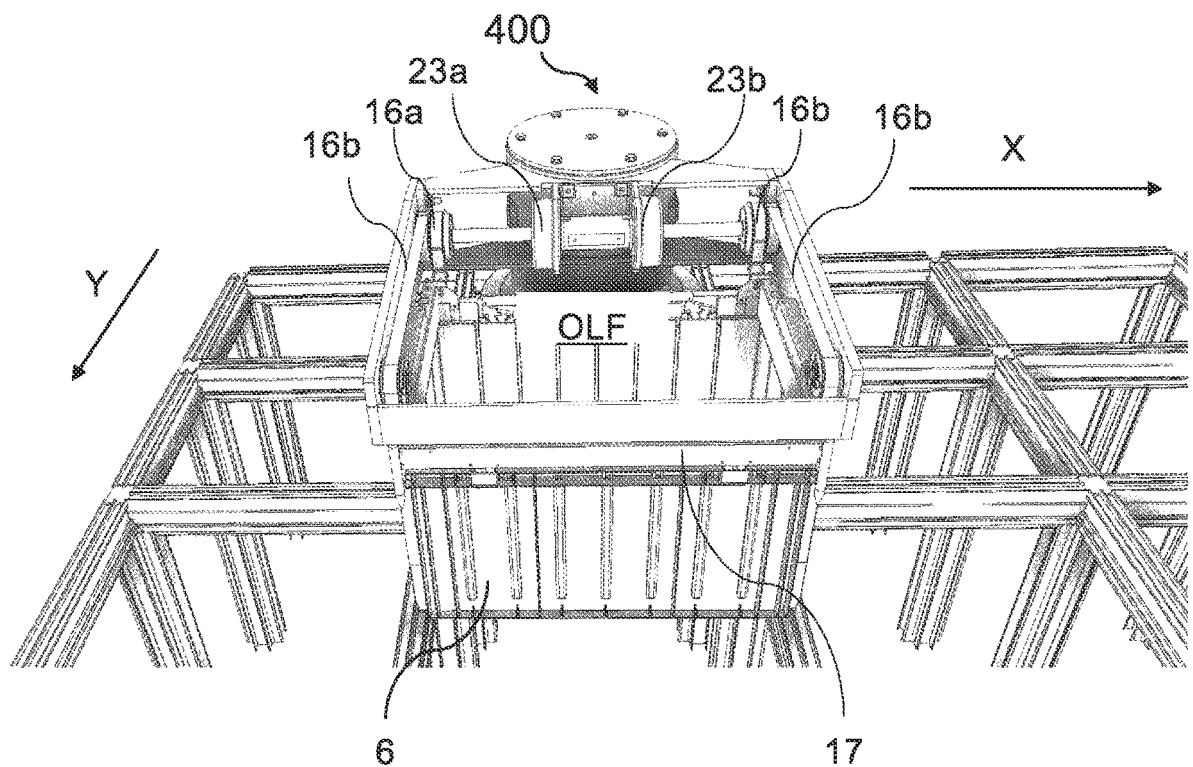
Figure 5C:
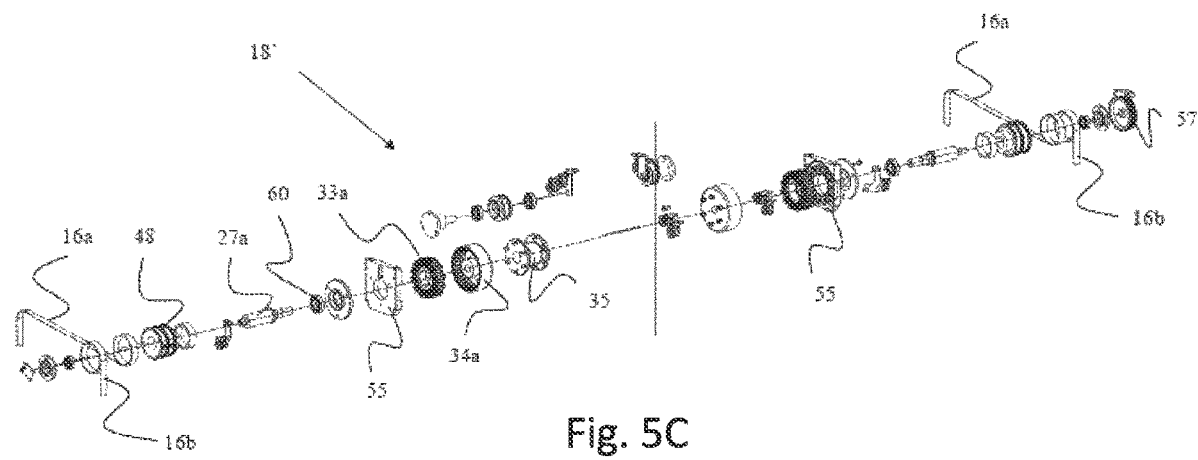
FIG. 5C is an exploded view of the lifting device of the container-handling vehicle in FIGS. 5A and 5B.
Figure 5D:
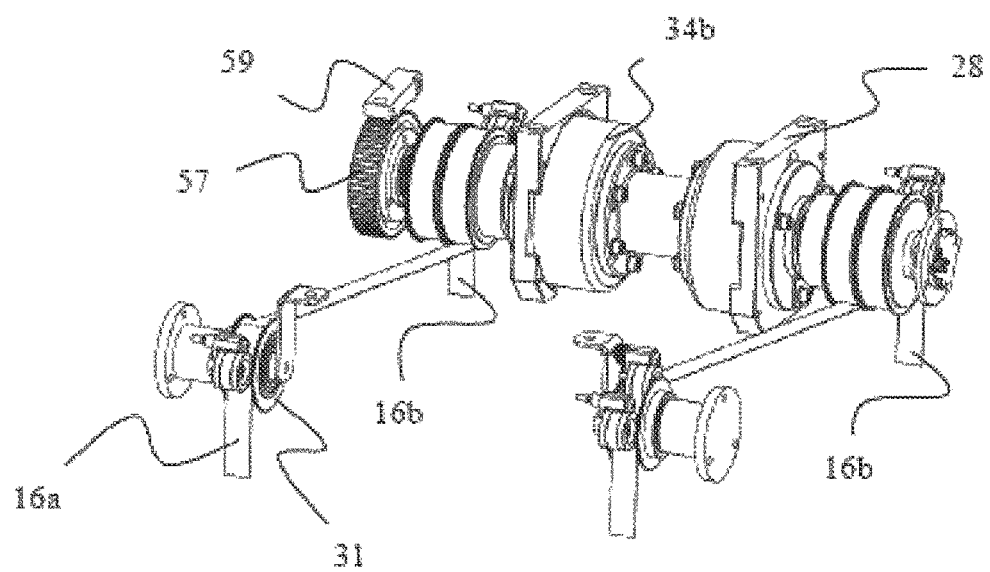
FIG. 5D is a perspective side view of the lifting device of the container-handling vehicle in FIGS. 5A and 5B.
Figure 5E:
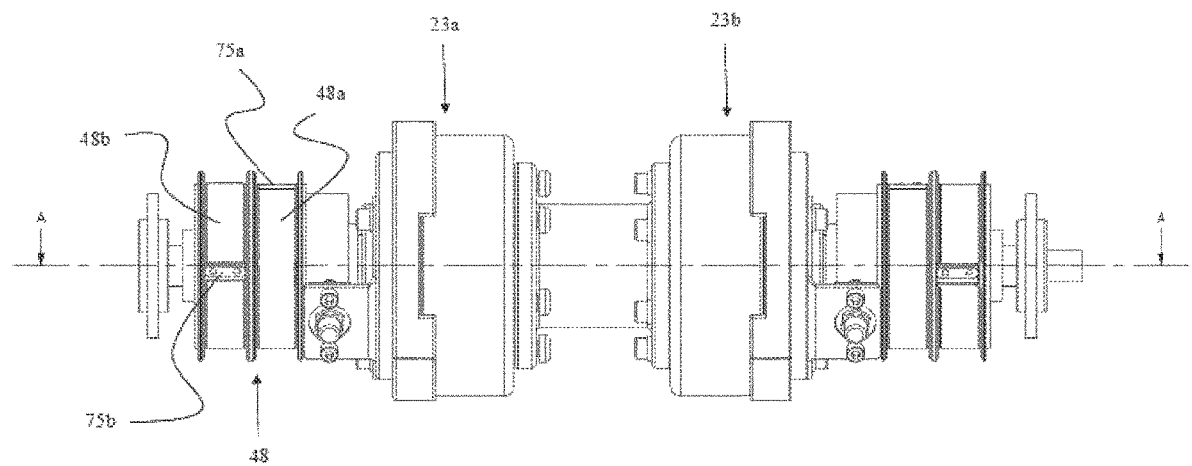
FIG. 5E is a side view of the lifting shaft assembly of the lilting device in FIGS. 5C and 5D.
Figure 5F:
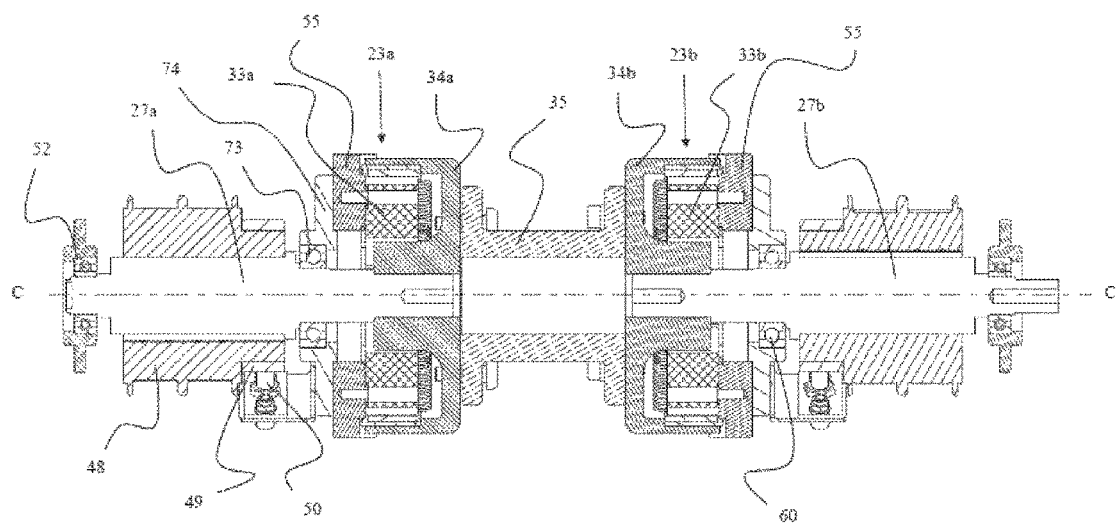
FIG. 5F is a cross-sectional view of the lifting shaft assembly in FIG. 5E.
Figure 5G:
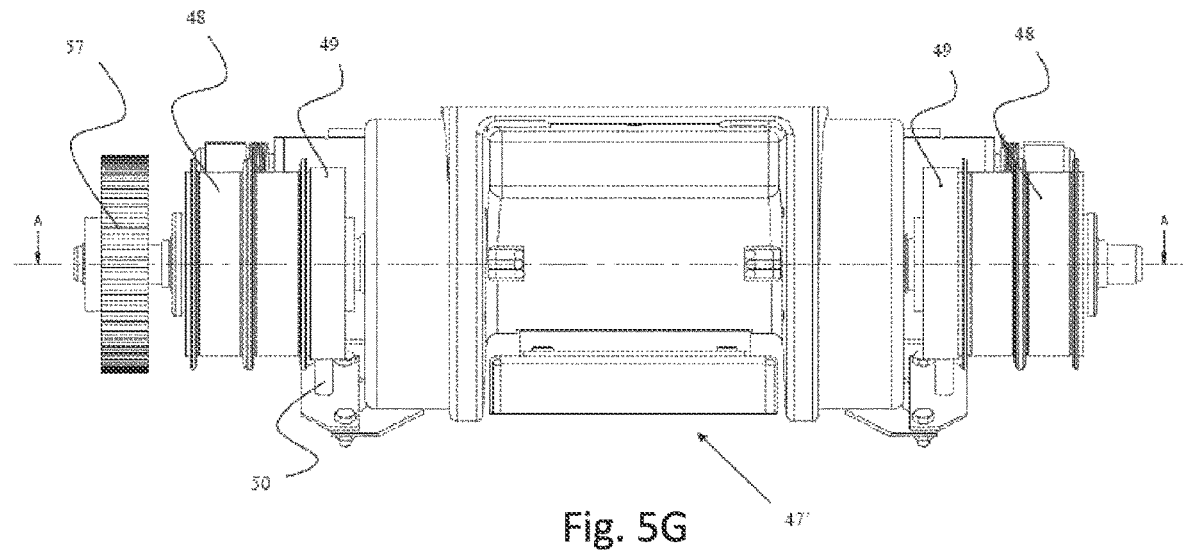
FIG. 5G is a side view of an alternative lifting shaft assembly using the lifting device in FIGS. 5C and 5D.
Figure 5H:
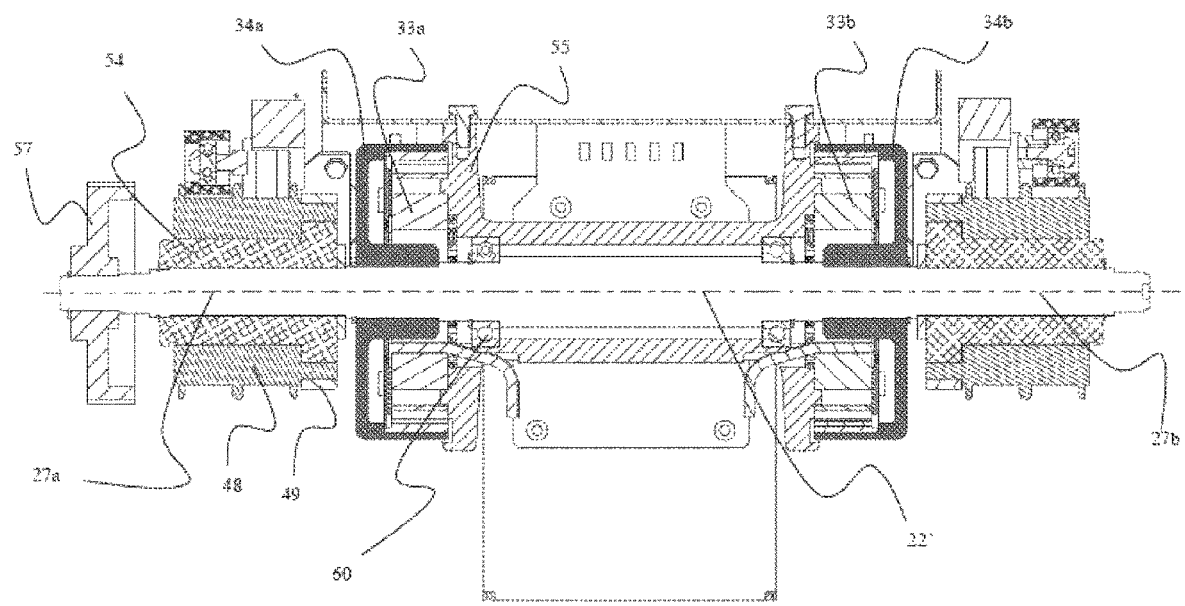
FIG. 5H is a cross-sectional view of the lifting shaft assembly in FIG. 5G.
Figure 5I:
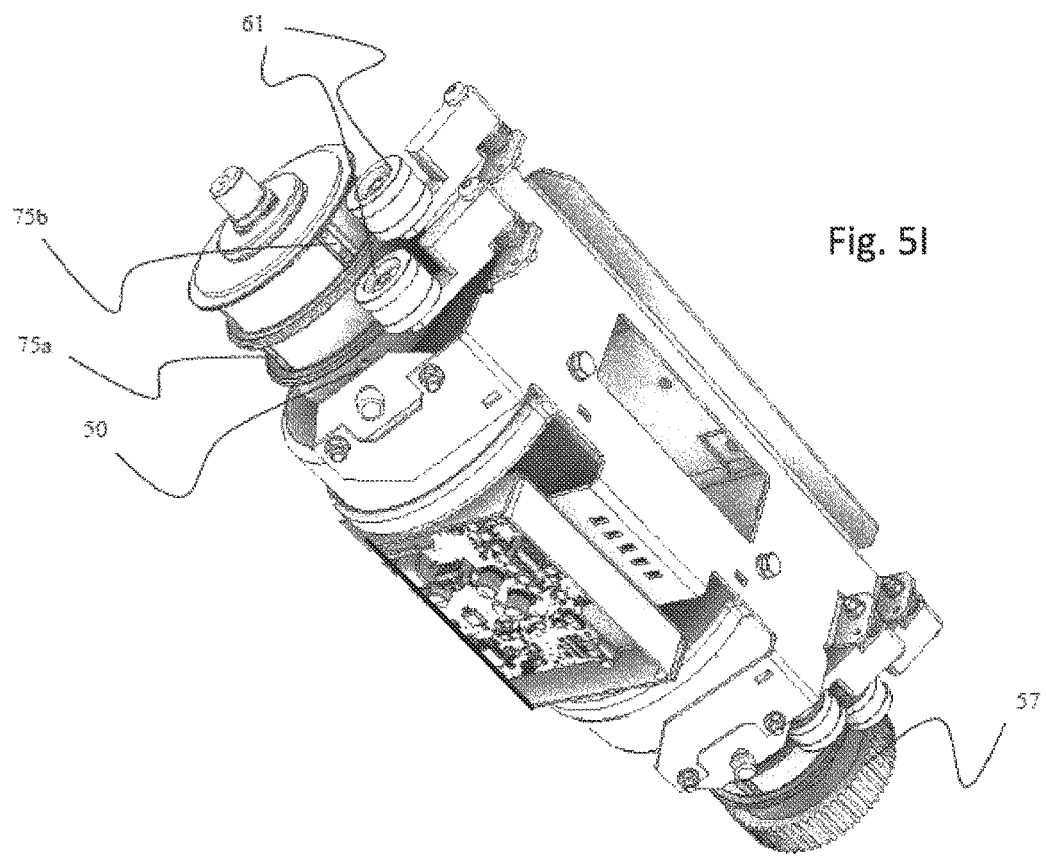
FIG. 5I is a perspective view from below of the lifting shaft assembly in FIGS. 5G and 5H.

In detail, FIGS. 5A and 5B show a container handling vehicle 400 with an alternative motor arrangement with an electric motor 23a, 23b with a rotor/stator motor encircling the lifting shaft 22, FIG. 5C is an exploded view of the lifting device 18' of the container-handling vehicle in FIGS. 5A and 5B, FIG. 5D is a perspective side view of the lifting device 18' of the container-handling vehicle 400 in FIGS. 5A and 5B, FIG. 5E is a side view of the lifting shaft assembly 47 of the lifting device 18' in FIGS. 5C and 5D, and FIG. 5F is a cross-sectional view of the lifting shaft assembly 47 in FIG. 5E.

Although the disclosed band guiding assembly comprises a pair of sheaves 31, see e.g. FIGS. 4B, 5D, it may alternatively be replaced by any suitable means for changing the direction of the first pair of lifting bands from a substantially horizontal direction to the vertical direction, such as a rotational shaft. In the container-handling vehicle 400, each of the sheaves 31 is separately connected to the vehicle body 13. However, depending on the specific design and space requirements, they may alternatively be arranged having a common shaft (not shown) extending between opposite sides of the vehicle body 13. However, such a common shaft will in most cases reduce the available access perimeter of the opening OSP in the hoist frame. Spring loaded guide wheels 61, may be arranged to ensure correct travel and positioning of the lifting bands when spooled on/off the dual band reels 48 and when passing over the sheaves 31 of the band guiding assembly (See details in FIG. 5I).

In the exemplary embodiment, the second pair of lifting bands 16b extends in the vertical direction from the lifting shaft 22 at the side of the lifting shaft facing towards the band guiding assembly 31, In this manner, the required horizontal position of the vertically extending second pair of lifting bands 16b, relative the corresponding band connecting elements 67 of the lifting frame 17, is obtained while keeping the lifting frame 17 (and consequently the container-handling vehicle) laterally offset.

To provide secure spooling of the lifting bands onto the lifting shaft 22, a dual band reel 48, see details in FIGS. 5E and 5F, is arranged at each of the end sections 27a,27b. The dual band reel 48 comprises a first reel section 48a and a second reel section 48b. Each reel section features a reel band connector 75a,75b for connecting two separate lifting bands, in this case a lifting band from each of the first and second pair of lifting bands 16a,16b. In the lifting device 18' the two pairs of lifting bands 16a,16b extend from the lifting shaft assembly 47 in two different directions, i.e. the first pair of lifting bands 16a extends in a substantially horizontal direction, while the second pair of lifting bands 16b extend in a vertical direction. To obtain an identical travelling distance of all the lifting bands when the lifting shaft 22 is rotated, it is important that all lifting bands have the same length spooled onto the dual band reels at all times so that they have the same working diameter at any given time. The thickness of the lifting bands is usually about 0.15 mm and the travelling length of a lifting band per rotation of the lifting shaft (or dual band reel) is dependent on the number of layers of lifting band spooled onto the dual band reel. In the disclosed embodiments, this is obtained by having the two reel band connectors 75a,75b of each dual band reel 48 staggered in the range of 75 to 105 degrees, preferably about 90 degrees. In other words, the two reel band connectors 75a,75b are arranged on their corresponding reel section at a position displaced/staggered by about 90 degrees relative one another and the centreline of the lifting shaft. Further, the dual band reels 48 are arranged such that the reel band connectors 75a connecting the first pair of lifting bands have the same radial position (i.e. not staggered relative each other), and the reel band connectors 75b connecting the second pair of lifting bands have the same radial position. It is noted that the displacement/staggering of the reel band connectors 75a,75b is dependent on the positioning of the band guiding assembly relative the lifting shaft assembly.

It is noted, that in an alternative embodiment wherein all four lifting bands extend in a horizontal direction from the dual band reels, the displacement may be in the range of −15 to 15 degrees, preferably about 0 degrees, or in the range of 165 to 195 degrees, preferably about 180 degrees, depending on the band guiding assembly. That is, if all four lifting bands extend in the same horizontal direction, the reel band connectors are not staggered, i.e. all reel band connectors have the same radial position. Such a solution may be relevant if there is arranged a second set of sheaves on the same side of the lifting shaft 22 as the first sheaves 31 closer to the lifting shaft 22 (for the lifting bands 16b). Alternatively, not relevant for this application but included for clarity reasons: If two of the four lifting bands, i.e. one lifting band from each of the dual band reels, extend in an opposite horizontal direction of the two other lifting bands, the reel band connectors are staggered by about 180 degrees.

The required accuracy of the degree of staggering/displacement depends on the thickness of the lifting bands and the maximum lifting length of the lifting device (i.e. the maximum distance between the lifting frame and the lifting band drive assembly).

As discussed above, to obtain a correct length of all the lifting bands 16 relative the lifting frame, i.e. such that the lifting frame 17 is kept horizontal during operation, the length of the lifting bands must be adjusted both initially, as well as at various service intervals since they tend to elongate slightly during use. The lifting bands are commonly connected and spooled onto separate reels arranged at an upper level within the container-handling vehicle 200,300, 400. To adjust a lifting band, the corresponding reel may be disconnected from a rotational shaft and the lifting band adjusted by free rotation of the reel relative the rotational shaft. The reel is subsequently fastened to the rotational shaft when the lifting band has the desired length. To obtain access to the separate reels, a service person is commonly required to remove at least some of the bodywork covering the vehicle body 13 or enter the cramped interior of the container receiving space used for housing storage containers. A variant of the described prior art solution may also be adapted for the exemplary embodiment, e.g. by replacing each dual band reel with two separate band reels which may individually be released to allow free rotation relative to the lifting shaft 22 when the bands are to be adjusted.

Referring to FIG. 4F, which is an enlarged view of the lifting frame in section A in FIG. 4E, the lifting bands are made of metal (commonly a steel alloy) and are used to conduct signals and electric power to end switch modules 29 and a control module 69 arranged within the outer boundary of the lifting frame 17. The end switch modules 29 comprises spring-loaded pins 68 for detecting when the lifting frame 17 is in contact with a storage container 6 and when the lifting frame is raised to its uppermost level within the container receiving space. To avoid short-circuiting the signal/electric power passing through the lifting bands, at least parts of the bracket 39 is made in a non-conducting material, such as a suitable plastic or composite material, such that the lifting bands (i.e. a lifting band from each of the dual band reels 48) are only in electric contact (via wires) with the lifting frame 17 at the control module 69. Thus, at least parts of the lifting band clamp 41 is made in an electrically conductive material, e.g. any suitable metal. In alternative embodiments, the lifting bands may for instance be used for power transfer only, while signals to the end switch modules 29 and control module 69 are transferred wirelessly or via a separate cable.

Each end switch module 29 is electrically connected (wires not shown but located in the lifting frame), via the control module 69 to two lifting band clamps 41 (or band connector hubs) having a different potential, such that signals/electric power may be received from, or sent to, a main control unit (not shown) inside the container-handling vehicle 400.

The control module 69 is also connected to and controls gripper motors 70 which are also arranged inside the lifting frame 17 to drive the gripper elements 24 via gripper bar 70b. Bin guides 30 in each corner of the lifting frame 17 assist in guiding and aligning the gripper elements 24 correctly relative the lift points in storage containers 6.

FIG. 4G shows a lifting frame 17 carrying a storage container 6, the remaining parts of the container handling vehicle and lifting device are removed.

For illustrative purposes, the lifting device 18' (i.e. the lifting shaft assembly 47, the lifting frame 17 and the two pairs of lifting bands) is shown in an exploded view in FIG. 5C and in a perspective view isolated from the vehicle body 13 in FIG. 5D.

Referring to FIG. 5F, to transfer signals/electric power from the main control unit, each dual band reel 48 features a slip ring 49 for electric signal transfer between the main control unit and the lifting bands via a conducting brush 50 in contact with the slip ring 49. The dual band reels are made in an electrically conducting material, such as a suitable metal. Although shown as a single reel, each dual band reel may comprise two distinct reels, one for each lifting band, as long as the two distinct reels are in electric contact with each other and the slip ring.

In the lifting shaft assembly 47 of FIG. 5A-5K, the two electric motors 23a, 23b are brushless DC (BLDC) electric motors, each comprising a stator 33a,33b, a stator connecting element 55 and a rotor element 34, see FIGS. 5E and 5F, To transfer rotary motion from the rotor elements 34a,34b of the electric motors to the lifting shaft 22 (i.e. the shaft made up of the first end section 27a, the second end section 27b and the intermediate shaft element 35), the rotor elements 34a,34b are interconnected via the intermediate shaft element 35 and each rotor element is connected to a respective end section 27a,27b. The rotor elements, the end sections and the intermediate shaft element have a common centreline C. To allow spooling of all the lifting bands (i.e. both pairs of lifting bands 16a,16b) onto a single lifting shaft 22, while at the same time being able to use the lifting bands as conductors for signals/electric power, as described above, the dual band reels 48 (or the end sections 27a,27b) must be electrically insulated from each other. In this manner the lifting bands connected to the dual band reel 48 at the first end section 27a may have a differential electric potential relative the lifting bands connected to the dual band reel 48 at the second end section 27b. In the lifting shaft assembly 47, this is achieved by having the intermediate shaft element 35 made in an electrically insulating material (i.e. providing an electrical insulating element), such as a suitable plastic/composite material. Alternatively, the motor may be a motor separate from the lifting shaft 22 but connected to the lifting shaft via an angled transmission as described above. It should be noted that for any chosen motor alternative, it is necessary to provide some kind of electrical insulation between the lifting bands 16a,16b, thus the described insulation is valid for any of the motor alternatives relevant for driving the lifting shaft 22.

Figure 5J:
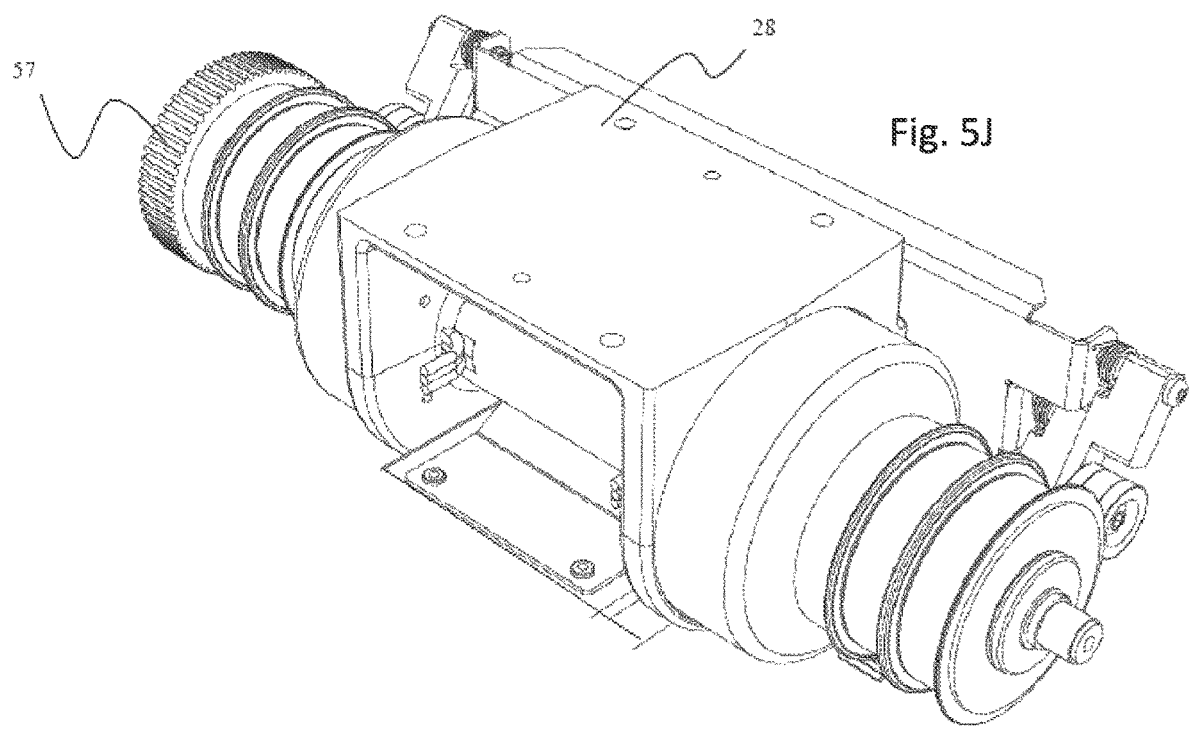
FIG. 5J is a perspective view from above of the lifting shaft assembly in FIGS. 5G-5I.
Figure 5K:
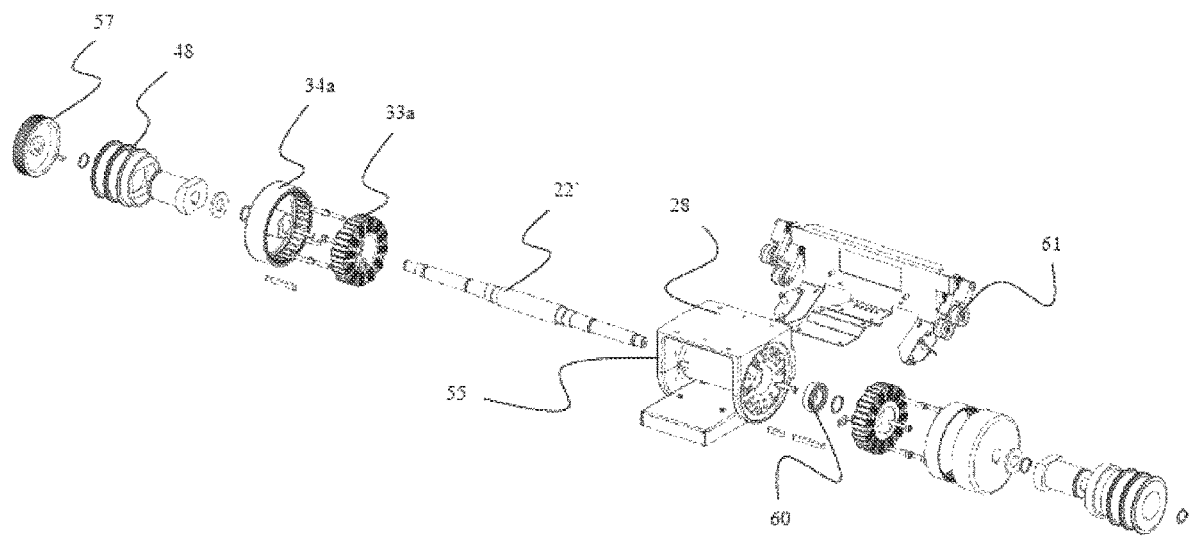
FIG. 5K is an exploded view of the lifting shaft assembly in FIGS. 5G-5J.

Referring to FIG. 5F, the lifting shaft assembly 47 comprises a bearing 52 on each of the end sections 27a,27b for rotatable connection of the end sections to the body 13 of the container-handling vehicle. The stator connecting element 55 of each stator 33a,33b comprises a motor bracket 28 (see. FIGS. 5J, 5K) for rigid connection to the vehicle's body 13 of the container-handling vehicle and a bearing 60 for rotary connection to the lifting shaft. In this manner, the lifting shaft 22,35 is rotatable relative the body 13, while the stators are kept stationary. To avoid short-circuiting via the vehicle body 13, the bearings 52 has a plastic housing insulating the respective end sections from the vehicle body 13. Similarly, the stator connecting elements 55 are insulated from the end sections 27a,27b by the plastic housings 74 of the bearings 73 to avoid short circuiting via the motor brackets 28.

An alternative embodiment of a lilting shaft assembly 47' is shown in FIGS. 5G-5K. A differentiating feature of the alternative lifting shaft assembly 47', in view of the lifting shaft assembly 47 described above, is the construction of the lifting shaft 22' as a single element, i.e. the lifting shaft 22' may be termed a unitary lifting shaft. In the lifting shaft assembly 47, the intermediate shaft element 35, interconnecting the first end section 27a and the second end section 27b, is able to electrically insulate the two end sections, and consequently the two dual band reels 48, by being made in an electrically insulating material. To obtain the same feature of electrically insulating the dual band reels 48, the alternative lifting assembly 47' features a sleeve-shaped element 54 made of electrically insulating material (i.e. an electrical insulating element) arranged between each of the first end section 27a and the second end section 27b and the corresponding dual band reels 48 (alternatively, each dual band reel 48 may be defined as comprising an inner section/element 54 in an electrically insulating material). An advantageous effect of insulating each dual band reel from its respective end section is that the lifting shaft assembly 47' is not required to be electrically insulated from the vehicle body 13 at its contact points, e.g. bearing 52 having a plastic housing, see above.

The motor(s) 23 of the lifting shaft assembly 47' features two stators 33a,33b, two rotor elements 34a,34b and a stator connecting element 55 being common for both stators 33a,33b. The stator connecting element 55 comprises a motor bracket 28 for rigid connection to the body 13 of the container-handling vehicle and bearings 60 for rotary connection to the lifting shaft 22'. A lift brake wheel 57 is arranged at one end of the lifting shaft assembly 47'. To actuate the brake wheel, a cooperating brake actuator arm 59 is commonly connected to the vehicle body 13. Although not shown, the lifting shaft assembly 47' is rotatably connected to the vehicle body by ball bearings similar to the ones described above.

It is noted that in other embodiments, the lifting shaft assemblies 47,47' may comprise only one motor or more than two motors. This will depend on the required torque of the lifting shaft 22,22' as well as the torque and size of current BLDC motors or other electric motor 23 used. For example, if the motor 23a connected to the first end section 27a of the lifting shaft assembly 47 was able to provide sufficient torque alone, the other motor 23b could be replaced by an element simply connecting the second end section 27b and the intermediate shaft element 35. Various alternative solutions would be obvious to the skilled person based on the teachings of the present disclosure. A common feature of all disclosed lifting shaft assemblies 47,47' in FIGS. 5A-5K is that the at least one motor 23a,23b is arranged between the first and second end section of the lifting shaft 22,22' to ensure a compact lifting shaft assembly.

Various types of brushless DC motors are known, including permanent magnet synchronous motor (using permanent magnets) and switched reluctance motors (does not use any permanent magnets).

The working principles of the permanent magnet synchronous brushless DC motor is well known to the skilled person, e.g. as described in https://en.wikipedia.org/wiki/Brushless_DC_electric_motor, and typically uses one or more permanent magnets in the rotor and electromagnets on the motor housing for the stator. A motor controller converts DC to AC. This design is mechanically simpler than that of brushed motors because it eliminates the complication of transferring power from outside the motor to the spinning rotor.

Further, using the electric motor(s) with rotor stator configuration requires a minimum of rotational parts (i.e. only the lifting shaft 22 and the sheaves 31) and no gears, sprockets and/or chains (commonly used in prior art lifting devices to transfer rotational movement from e.g. a motor to various shaft assemblies), and results in the lifting device 18' being significantly more silent than prior art lifting devices. The latter is particularly important in a storage system comprising multiple container-handling vehicles.

Figure 6A:
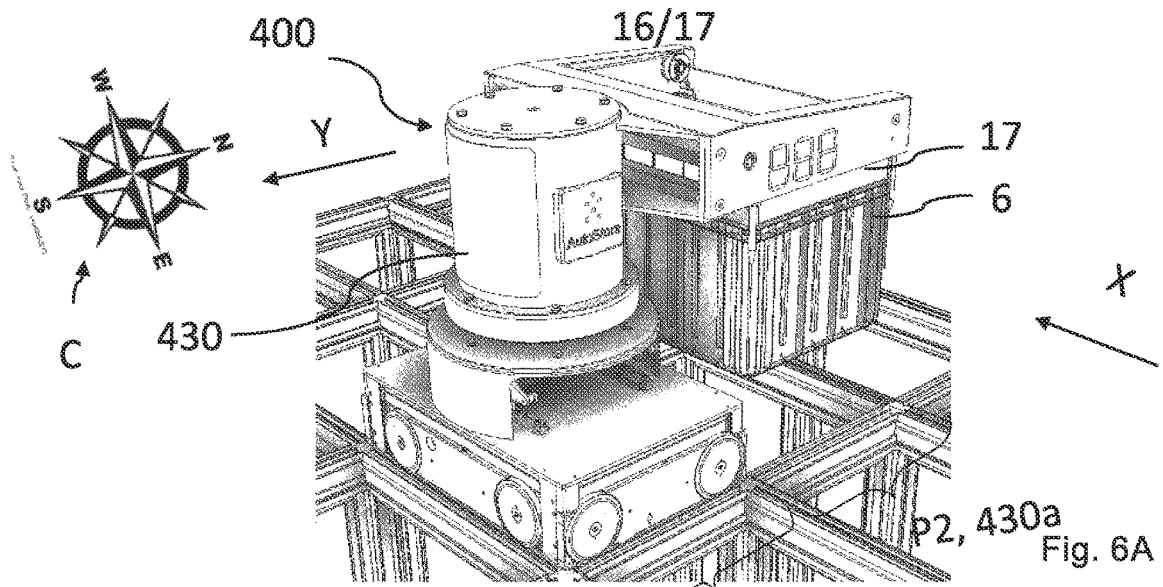
FIGS. 6A-6C show sequences of a 180 degrees rotation of a container handling vehicle, where
Figure 6B:
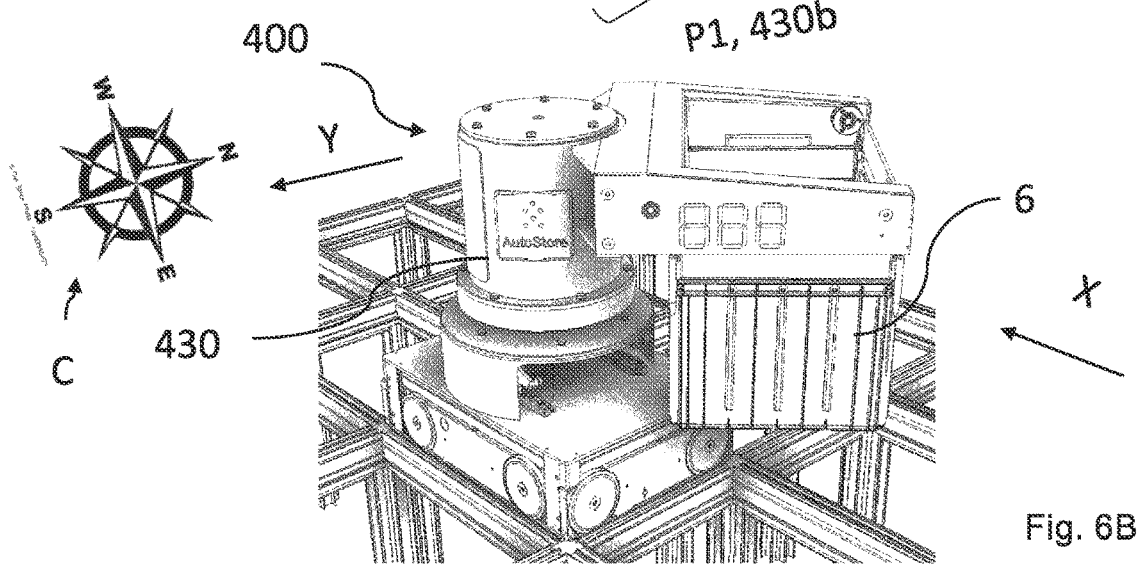
Figure 6C:
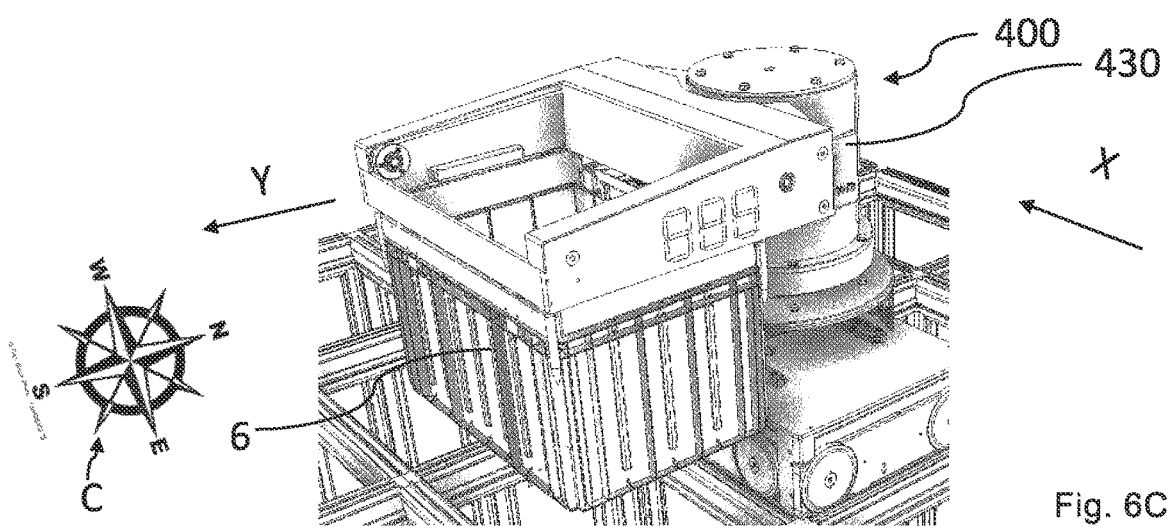

FIGS. 6A-6C show sequences of a 180 degrees rotation of a container handling vehicle, where FIG. 6A shows the container handling vehicle with a storage container directed towards north, FIG. 6A shows a storage container during the rotational motion with the storage container directed northeast, and FIG. 6C shows the situation after 180 degrees rotation of the storage container with the storage container directed towards south.

The turret 430 of the container handling vehicle 400 comprises a lifting frame 17 arranged within and/or below the hoist frame P2 for vertical transportation of a storage container 6, e.g. lifting a storage container 106 from a storage column 105 and bringing it to a position in a container receiving space 21 between the underlying rail system and the hoist frame 430a, and also for lowering a storage container 106 from the container receiving space 21 into a storage column 105. The features of the container lifting part, i.e. the hoist frame 430a, are the same as described above in relation to FIGS. 4 and 5.

As is most apparent in FIG. 6A, 6B, and also described in relation to FIGS. 4C and 4D above, the container handling vehicle 400 has a footprint in the X direction, i.e. the horizontal extent in the X direction seen from above, covering two grid cells 122 and a footprint in the Y direction, i.e. the horizontal extent in the Y direction seen from above, covering a single grid cell 122.

A rotation of the turret 430 relative to the base 431 is illustrated in FIGS. 6A-6C showing a vehicle 400 initially in a position where the storage container 6 carried by the hoist frame 430a is directed in a negative Y-direction (towards north, see compass C, FIG. 6A) and after rotation of the turret 430 180°, resulting in a direction of the hoist frame 430a along a positive Y-direction (towards south, FIG. 6C). FIG. 6B shows the container handling vehicle 430 where the turret 430 has been rotated approximately 45° in the horizontal plane relative to the Y direction (the direction of the hoist frame 430a is towards North-East in compass C).

Figure 6D:
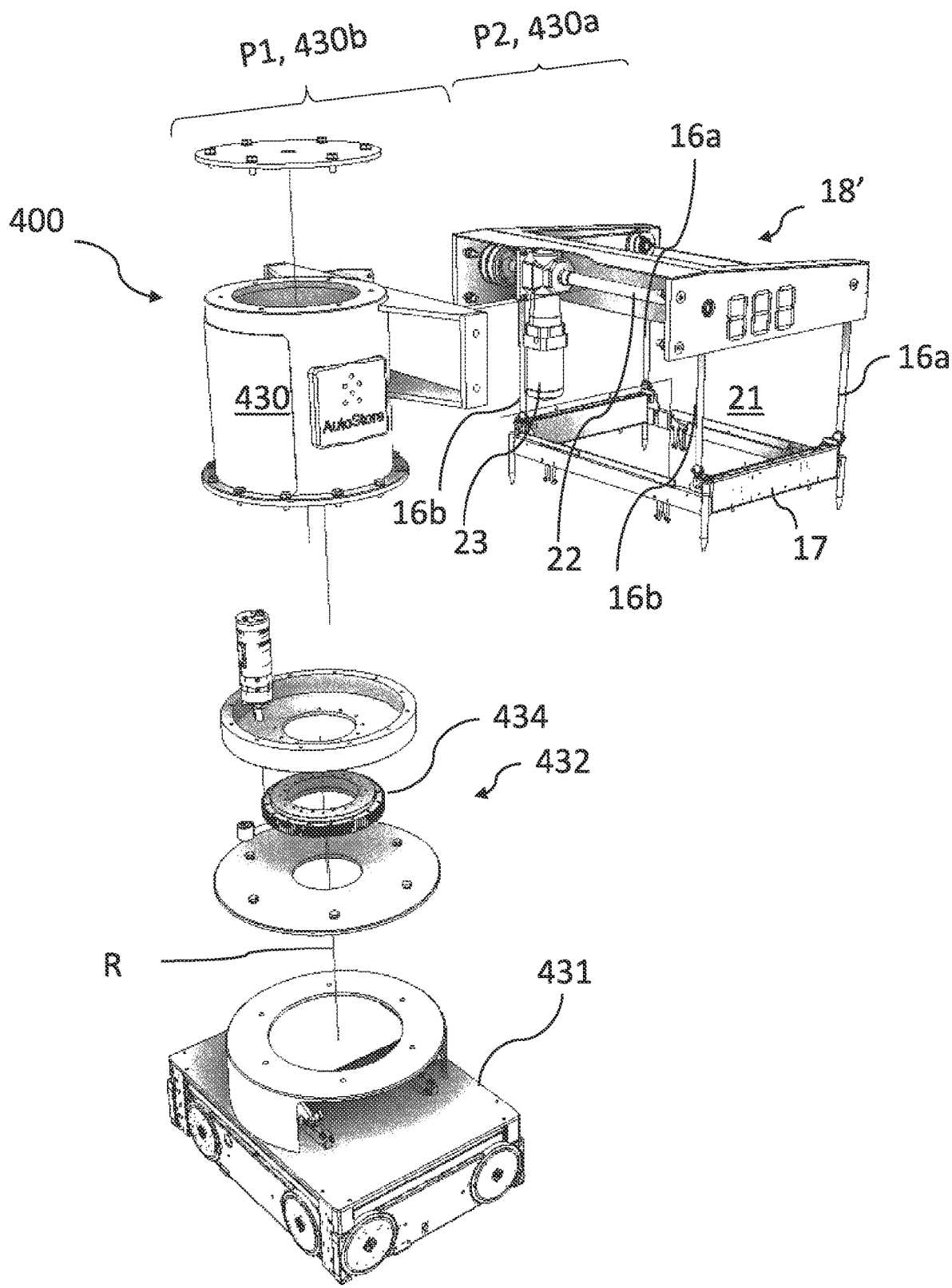
FIG. 6D is an exploded view of the container handling vehicle of FIG. 4-G illustrating the components used for rotating the container handling vehicle.

Referring to FIG. 6D, the rotation of the turret 430 is achieved by operating the swivel device 432 by a rotor activating motor 434, preferably arranged within the base 431, to rotate around rotational axis R. The exploded view of FIG. 6D illustrates the components used for rotating the container handling vehicle. Each turret 430 comprises a bulk section 430b (corresponding to the vehicle module part P1) and a hoist frame 430a (corresponding to the hoist frame P2), extending horizontally in the X direction.

The consequence of the cantilever design described above is that, when the vehicle 400 is positioned above a grid opening 115 e.g. to access a container 6,106 in the storage column 105 located vertically below the grid opening 122, the hoist frame 430a will extend over a neighboring grid opening 115. Normally this would prevent a second vehicle from travelling over this neighboring grid cell, thereby potentially reducing the overall capacity of the automated storage and retrieval system 1.

However, due to the rotatability of vehicle 400 other vehicles may be allowed to pass over a neighboring grid opening by rotating the rotation part 430, and thereby the hoist frame 430a, 180° or more in respect of the base 431, prior to, and/or during, the passing of the other vehicle(s). Proper timing of the rotation may be set by the control system. This embodiment is not shown in the accompanied figures.

The possibility of rotating the hoist frame 430a has additional significant advantages over the prior art cantilever design disclosed in NO317366. For example, due to the possibility to rotate the rotating part 430 180° or more, each vehicle 400 may transport storage columns 106 from/to port columns 119,120 and/or conveyor belts situated at two facing vertical sides at the outer boundaries of the storage grid 104. If the port columns and/or the conveyor belts are situated within the storage grid 104 as illustrated in FIG. 1, each vehicle 400 may transport storage containers 106 from/to ports/conveyor belts situated at at least two vertical sides at the outer boundaries of the storage grid 104, i.e. vertical sides oriented both in X direction and Y direction. Another advantage in respect of the prior art cantilever design is that all vehicles 400 operating on the system 1 may access all storage columns 105, also the storage columns 105 located at the outer boundaries of the storage grid 104. In addition, any external robot arms or similar arranged at one outer boundary and accessing only the outer boundary grid column(s), may access the storage container 6 carried by the container handling vehicle 400.

The figures provide a solution to the problems associated with prior art, namely a solution where the content of the storage containers is accessible during transport of the container handling vehicles. Furthermore, the disclosed solution provides an improved lifting device, where the requirement of a lifting band drive assembly featuring a plurality of secondary shafts and/or sheaves, onto which the lifting bands are spooled on and off, are not required. Furthermore, the solution simplifies the arrangement of lifting shaft and lifting bands, and the required positioning of the lifting bands relative the lifting frame is no longer an issue as all lifting bands are spooled onto the same lifting shaft.

In the preceding description, various aspects of the automated storage and retrieval system and associated method of picking product items using robotic operators have been described with reference to the illustrative embodiment.

For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

REFERENCE NUMERALS

| | |
|---|---|
| 1 | Automated storage and retrieval system |
| 4 | Grid |
| 6 | Storage container |
| 13 | Vehicle body |
| 14 | First set of wheels |
| 15 | Second set of wheels |
| 16a | First pair of lifting bands |
| 16b | Second pair of lifting bands |
| 17 | Lifting frame |
| 18' | Lifting device |
| 21 | container receiving space |
| 22, 22' | Lifting shaft |
| 23 | Motor |
| 23a | Electric motor |
| 23b | Electric motor |
| 24 | Gripper elements |
| 25 | Bin switch gripper |
| 26 | Gripper bar |
| 27 | Top switch gripper |
| 27a | First end section of lifting shaft |
| 27b | Second end section of lifting shaft |
| 28 | Motor bracket |
| 29 | Angled transmission |
| 30 | Bin guides |
| 31 | Sheave |
| 32 | Rolling device |
| 32a | First set of wheels in first direction X |
| 32b | Second set of wheels in second direction Y |
| 33a, 33b | Stator |
| 34, 34a, 34b | Rotor elements |
| 35 | Intermediate shaft element |
| 36 | Arm |
| 37 | Crosspiece |
| 39 | Bracket |
| 41 | lifting band clamp |
| 47, 47' | Lifting shaft assembly |
| 48 | Dual band reels |
| 48a | first reel section |
| 48b | Second reel section |
| 49 | Slip ring |

-continued

| | |
|---|---|
| 50 | conducting brush |
| 52 | Bearing |
| 54 | sleeve-shaped element |
| 55 | Stator connecting element |
| 57 | Brake wheel |
| 59 | brake actuator arm |
| 60 | Bearings |
| 61 | Spring loaded guide wheels |
| 67 | lifting band connecting elements |
| 68 | spring-loaded pins |
| 69 | control module |
| 70 | gripper motors |
| 70b | Gripper bar |
| 73 | Bearings |
| 75a, 75b | Reel band connector |
| 100 | Framework structure |
| 102 | Upright members of framework structure |
| 103 | Horizontal members of framework structure |
| 104 | Storage grid/three-dimensional grid |
| 105 | Storage column |
| 106 | Storage container |
| 107 | Stack |
| 108 | Rail system/Container handling vehicle rail system |
| 110 | First set of parallel rails in first direction X |
| 110a | First neighboring rail of first set |
| 110b | Second neighboring rail of first set |
| 111 | Second set of parallel rails in second direction Y |
| 111a | First neighboring rail of second set |
| 111b | Second neighboring rail of second set |
| 112 | Grid column |
| 115 | Grid opening/Container handling vehicle grid opening |
| 119 | Delivery column |
| 120 | Delivery column |
| 122 | Grid cell |
| 200 | First prior art container handling vehicle |
| 201 | Wheel arrangement |
| 300 | Second prior art container handling vehicle |
| 301 | Wheel arrangement |
| 400 | Third container handling vehicle |
| 401 | Wheel arrangement |
| 430 | Turret |
| 430a | Cantilever of turret |
| 430b | Bulk section |
| 431 | Base/stationary part of vehicle 400 |
| 432 | Swivel device |
| 434 | Rotational drive means/rotation activating motor |
| X | First direction |
| Y | Second direction |
| Z | Third direction |
| P | Horizontal plane of rail system |
| Wo | Width of container handling vehicle grid opening |
| Wc | Width of container handling vehicle grid cell |
| Lo | Length of container handling vehicle grid opening |
| Lc | Length of container handling vehicle grid cell |
| Wod | Width of delivery vehicle grid opening |
| Wcd | Width of delivery vehicle grid cell |
| Lod | Length of delivery vehicle grid opening |
| Lcd | Length of delivery vehicle grid cell |
| P1 | Vehicle module part |
| P2 | Hoist frame |
| R | Rotational axis of turret |
| OLF | Opening lifting frame (access perimeter) |
| OSP | Opening hoist frame (access perimeter) |
| C | Compass |
| L | Vertical plane separating vehicle module part and hoist frame |

The invention claimed is:

1. A container handling vehicle for picking up storage containers from a three-dimensional grid of a storage system, the container handling vehicle comprising:
a vehicle module part (P1); and
a container lifting part,
the vehicle module part (P1) comprising a first set of wheels for moving the container handling vehicle in a first direction (X) and a second set of wheels for moving the container handling vehicle in a second direction (Y), the second direction being perpendicular to the first direction, wherein
the container lifting part extends sideways as a cantilever from the vehicle module part (P1) and comprises:
a hoist frame (P2) with an opening (OSP) defining an access perimeter;
a hoist mechanism carried by the hoist frame (P2);
a plurality of lifting bands connected to the hoist mechanism and guided by the hoist frame (P2); and
a lifting frame for releasable connection to a storage container of the storage containers, the lifting frame being suspended in a horizontal orientation from the hoist frame (P2) by the plurality of lifting bands and being liftable up to the hoist frame by the hoist mechanism, the lifting frame having an opening (OLF) defining an access perimeter,
wherein the access perimeter of the opening (OSP) in the hoist frame (P2) corresponds in shape and alignment to the access perimeter of the opening (OLF) in the lifting frame to allow access to items in the storage container through the respective openings (OSP, OLF) when the lifting frame is lifted up to the hoist frame (P2) by the hoist mechanism.

2. The container handling vehicle according to claim 1, wherein the access perimeters of the openings (OSP, OLF) in the hoist frame (P2) and the lifting frame are substantially equal to an access perimeter of an opening in the storage container.

3. The container handling vehicle according to claim 1, wherein the opening (OSP) in the hoist frame (P2), the opening (OLF) in the lifting frame, and an opening in a top of the storage container all have a substantially equal vertical projection thereby securing access from above the container handling vehicle to the interior of the storage container.

4. The container handling vehicle according to claim 3, wherein the hoist frame (P2) comprises a pair of arms and wherein a sheave is connected to a distal end of each arm.

5. The container handling vehicle according to claim 4, wherein the hoist frame (P2) comprises a crosspiece connected at the distal ends of the arms, thereby forming an enclosure for the access perimeter of the opening (OSP) in the hoist frame (P2).

6. The container handling vehicle according to claim 4, wherein axes of rotation for the sheaves extend perpendicularly to the arms of the hoist frame.

7. The container handling vehicle according to claim 4, wherein the hoist mechanism comprises a lifting shaft for winding up and unwinding the lifting bands simultaneously.

8. The container handling vehicle according to claim 7, wherein the lifting bands are guided by the sheaves to the lifting shaft.

9. The container handling vehicle according to claim 7, wherein connection points for the lifting bands on the lifting shaft are arranged laterally offset relative the lifting frame, in all positions of the lifting frame.

10. The container handling vehicle according to claim 4, wherein ends of lifting bands of the plurality of lifting bands at the distal end of the hoist frame (P2) are spaced wider on the lifting frame than lifting bands of the plurality of lifting bands closest to the vehicle module part (P1).

11. The container handling vehicle according to claim 1, wherein a motor for the hoist mechanism is arranged between a side of the opening (OLF) of the hoist frame closest to the vehicle module part (P1) and a lifting shaft.

12. The container handling vehicle according to claim 11, wherein the motor is an electric motor with a rotor and stator of the motor encircling the lifting shaft.

13. The container handling vehicle according to claim 11, wherein the motor is connected to the lifting shaft via an angled transmission and extends below the lifting shaft in the vehicle module part (P1).

14. The container handling vehicle according to claim 1, wherein the container lifting part is mounted on a turret for rotation with respect to the vehicle module part (P1).

15. A method of handling a storage container using a container handling vehicle for picking up storage containers from a three-dimensional grid of a storage system, the container handling vehicle comprising:
a vehicle module part (P1); and
a container lifting part,
the vehicle module part (P1) comprising a first set of wheels for moving the container handling vehicle in a first direction (X) and a second set of wheels for moving the container handling vehicle in a second direction (Y), the second direction being perpendicular to the first direction, wherein
the container lifting part extends sideways as a cantilever from the vehicle module part (P1) and comprises:
a hoist frame (P2) with an opening (OSP) defining an access perimeter;
a hoist mechanism carried by the hoist frame (P2);
a plurality of lifting bands connected to the hoist mechanism and guided by the hoist frame (P2); and
a lifting frame for releasable connection to a storage container of the storage containers, the lifting frame being suspended in a horizontal orientation from the hoist frame (P2) by the plurality of lifting bands and being liftable up to the hoist frame by the hoist mechanism, the lifting frame having an opening (OLF) defining an access perimeter,
wherein the access perimeter of the opening (OSP) in the hoist frame (P2) corresponds in shape and alignment to the access perimeter of the opening (OLF) in the lifting frame to allow access to items in the storage container through the respective openings (OSP, OLF) when the lifting frame is lifted up to the hoist frame (P2) by the hoist mechanism, wherein the method comprises:
lifting a storage container up on a side of the vehicle module part (P1) to a container receiving space below the hoist frame (P2) of the container handling vehicle such that the access perimeter of the opening (OSP) in the hoist frame (P2) corresponds to the access perimeter of the opening (OLF) in the lifting frame carrying the storage container (6) providing a through-going opening from above the container handling vehicle to an interior of the storage container; and
picking product item(s) from, or placing product item(s) into, the interior of the storage container through the through-going opening.

* * * * *